(12) United States Patent
Coad et al.

(10) Patent No.: US 6,851,105 B1
(45) Date of Patent: Feb. 1, 2005

(54) METHOD AND SYSTEM FOR GENERATING, APPLYING, AND DEFINING A PATTERN

(75) Inventors: Peter Coad, Raleigh, NC (US); Dietrich Charisius, Stuttgart (DE); Alexander Aptus, Esslingen (DE)

(73) Assignee: Borland Software Corporation, Scotts Valley, CA (US)

( * ) Notice: Subject to any disclaimer, the term of this patent is extended or adjusted under 35 U.S.C. 154(b) by 799 days.

(21) Appl. No.: 09/680,030

(22) Filed: Oct. 4, 2000

Related U.S. Application Data

(60) Provisional application No. 60/199,046, filed on Apr. 21, 2000, and provisional application No. 60/157,826, filed on Oct. 5, 1999.

(51) Int. Cl.[7] .............................................. G06F 9/44
(52) U.S. Cl. ...................... 717/106; 717/108; 717/109; 717/114; 717/116
(58) Field of Search ........................ 717/100, 103–106, 717/108, 109, 114, 116, 138, 117; 719/315; 715/507, 513; 345/473, 588; 706/50, 48; 709/236; 382/159

(56) References Cited

U.S. PATENT DOCUMENTS 4,882,756 A * 11/1989 Watari ........................ 704/241
4,956,791 A * 9/1990 Lee et al. .................... 706/48

(List continued on next page.)

FOREIGN PATENT DOCUMENTS

EP 1 030 242 A2 8/2000
EP 1 030 252 A1 8/2000

OTHER PUBLICATIONS

TITLE: Generating Programming Language–based Pattern Matchers, author: Paul et al, ACM, Oct., 1993.*

(List continued on next page.)

*Primary Examiner*—Chameli Das
(74) *Attorney, Agent, or Firm*—MacCord Mason PLLC

(57) ABSTRACT

The present invention relates a method and systems for generating, applying and defining patterns for software development. The software development tool receives an indication of a pattern, generates software code reflecting the pattern, and stores identification information for the pattern in a comment associated with the generated software code. The software development tool receives an indication of the software element, determines whether the software element is capable of playing the role, and when it is determined that the software element is capable of playing the role, designates that the software element plays the role in the pattern. The software development tool displays a plurality of software elements to a user, receives an indication of a selected one of the plurality of software elements, receives an indication of a user-defined pattern role that the selected software element plays in a pattern, and stores the plurality of software elements as the pattern.

22 Claims, 30 Drawing Sheets

U.S. PATENT DOCUMENTS

| | | | | |
|---|---|---|---|---|
| 5,189,709 A | * | 2/1993 | Wang et al. | 382/215 |
| 5,485,569 A | * | 1/1996 | Goldman et al. | 715/507 |
| 5,699,310 A | | 12/1997 | Garloff et al. | |
| 5,748,769 A | * | 5/1998 | Nishimura et al. | 382/159 |
| 5,768,590 A | * | 6/1998 | Kimura et al. | 717/106 |
| 5,860,004 A | | 1/1999 | Fowlow et al. | |
| 5,915,259 A | * | 6/1999 | Murata | 715/513 |
| 5,916,305 A | * | 6/1999 | Sikdar et al. | 709/236 |
| 5,946,484 A | | 8/1999 | Brandes | |
| 5,960,200 A | | 9/1999 | Eager et al. | |
| 6,085,035 A | * | 7/2000 | Ungar | 717/116 |
| 6,122,757 A | * | 9/2000 | Kelley | 714/39 |
| 6,292,938 B1 | * | 9/2001 | Sarkar et al. | 717/138 |
| 6,346,945 B1 | * | 2/2002 | Mansurov et al. | 345/473 |
| 6,459,435 B1 | * | 10/2002 | Eichel | 345/588 |
| 6,615,199 B1 | * | 9/2003 | Bowman-Amuah | 706/50 |
| 6,651,108 B2 | * | 11/2003 | Popp et al. | 719/315 |
| 6,651,240 B1 | * | 11/2003 | Yamamoto et al. | 717/108 |
| 6,691,122 B1 | * | 2/2004 | Witte et al. | 707/101 |
| 6,748,588 B1 | * | 6/2004 | Fraser et al. | 717/146 |

OTHER PUBLICATIONS

TITLE: A Pattern–Based Application Generator for Building Simulation, author: Schuetze et al, ACM, Nov., 1997.*

TITLE: Using Design Patterns to Develop Reusable Object–Oriented Communication Software, author: Schmidt, ACM, Oct., 1995.*

A Mechanism for Automatically and Dynamically Changing Software Components, Maruyama et al, ACM, 1997.*

* cited by examiner

METHOD AND SYSTEM FOR GENERATING, APPLYING, AND DEFINING A PATTERN

CROSS-REFERENCE TO RELATED APPLICATIONS

The following identified U.S. patent applications are relied upon and are incorporated by reference in this application:

U.S. Provisional Application No. 60/157,826, entitled "Visual Unified Modeling Language Development Tool," filed on Oct. 5, 1999;

U.S. Provisional Application No. 60/199,046, entitled "Software Development Tool," filed on Apr. 21, 2000;

U.S. patent application Ser. No. 09/680,063, entitled "Method And System For Developing Software," and filed on the same date herewith;

U.S. patent application Ser. No. 09/680,065, entitled "Method And System For Displaying Changes Of Source Code," and filed on the same date herewith; and U.S. patent application Ser. No. 09/680,066, entitled "Method And System For Collapsing A Graphical Representation Of Related Elements," and filed on the same date herewith.

FIELD OF THE INVENTION

The present invention relates generally to data processing systems and, more particularly, to methods and systems for generating, applying, and defining patterns for software development.

BACKGROUND OF THE INVENTION

Patterns are a literary form of software engineering problem-solving discipline. The goal of patterns within the software community is to create a body of literature to help software developers resolve recurring problems encountered in various domains (e.g., software architecture and design, and software development processes and organizations) throughout all of software development. Patterns help create a shared language for communicating insight and experience about the recurring problems and their solutions to promote proven techniques while avoiding "re-inventing the wheel."

In general, a pattern is the abstraction from a concrete form that keeps recurring in specific non-arbitrary contexts. Each pattern has at least one participant, and each participant plays a role in the pattern. For example, one well-known pattern is an adapter pattern. The adapter pattern solves the recurring problem of allowing classes, which could not otherwise work together, to work together because of incompatible interfaces. As is well known in object-oriented programming, a class is a blueprint used to create an object that has a known identity, state, and behavior. An interface is an abstract class or a Java™ interface that unrelated objects can use to interact with one another. It defines a set of method signatures, but does not implement them. A class that implements the interface agrees to implement all of the methods defined in the interface. The adapter pattern identifies the following as participants in its pattern: a client class, a target interface, an adapter class, and an adaptee class. The roles of these participants in the adapter pattern are described as follows. The client class calls methods associated with the target interface. The adaptee class has a method that a software developer wants the client class to call, but the adaptee's method is not supported by the target interface. Rather than modify the adaptee class to implement the target interface, which may not be an option if the software developer doesn't have the source code for the adaptee class, the software developer manually codes the adapter class participant to implement the target interface such that it calls the adaptee class method. This effectively delegates the method call from the client to the adapter so that the client class can remain independent from the adaptee class. Following the adapter pattern to delegate method calls made through a single interface is especially important where a client class needs to call multiple methods from different classes that are not associated with the single interface.

Software visionaries have published descriptions of a number of patterns in addition to the adapter pattern that solve a variety of common design problems faced by software developers. The published descriptions typically utilize the well-known Unified Modeling Language (UML) to graphically illustrate a pattern. UML is a general-purpose notational language for visualizing, specifying, constructing, and documenting complex object-oriented software systems. UML is more clearly described in the following references, which are incorporated herein by reference: (1) Martin Fowler, *UML Distilled Second Edition: Applying the Standard Object Modeling Language*, Addison-Wesley (1999); (2) Booch, Rumbaugh, and Jacobson, *The Unified Modeling Language User Guide*, Addison-Wesley (1998); (3) Peter Coad, Jeff DeLuca, and Eric Lefebvre, *Java Modeling in Color with UML Enterprise Components and Process*, Prentice Hall (1999); and (4) Peter Coad, Mark Mayfield, and Jonathan Kern, *Java Design: Building Better Apps & Applets* (2nd Ed.), Prentice Hall (1998).

These literary descriptions and graphical representations identify the following elements of a pattern: a meaningful pattern name that reflects the knowledge and structure of the pattern, the underlying problem solved and the context in which the problem seems to recur, the solution in terms of its participants (e.g., classes and objects) and the relationships between its participants (e.g., static and dynamic rules for composition, inheritance, and instantiation that generally dictate the roles of pattern participants), and the ramifications of applying the pattern (e.g., tradeoffs based on chosen design pattern alternative). It is up to the software developer to manually generate the code corresponding to the pattern and tailor it to the given application or project. This manual generation of a pattern instance suffers from a number of problems: first, it is time-consuming, tedious, and subject to human error; and second, a software developer that is behind in his work will typically skip commenting his code to reflect the use of a common pattern. Hence, other software developers looking to make use of or replace the common pattern cannot easily locate it within the existing code. Conventional software development tools do not address these problems.

Software visionaries have also published techniques to follow for redesigning unwieldy program code prior to or concurrent with adding new functionality that may otherwise add to the complexity of the existing program. These techniques are collectively known as "refactoring." Refactoring rejuvenates software by improving the structure and performance of existing software without changing the behavior of the software. When refactoring, the software developer typically takes manual, incremental steps to improve the structure of existing code to reduce complexity and avoid prolonged debugging. Such incremental steps may include renaming a method, moving a field from one class to another, or consolidating two similar methods in a superclass. New functionality is generally added after refactoring.

Applying a pattern to existing code combines refactoring with adding new functionality to improve the design of existing code. When applying a pattern, a software developer follows published instructions for generating the known pattern, but manually ascertains what elements of the preexisting code need to be modified or deleted (i.e., refactoring) as well as what elements of the pattern need to be added (i.e., additional functionality) to implement the pattern. Conventional software development tools do not provide support for applying a pattern to existing code. The developer also may deem a portion of the existing code as an undesirable or bad pattern that needs to be redesigned. Faced with the problem of redesigning a bad pattern, the developer typically surveys the existing code to detect any instances of the bad pattern and then manually applies a selected pattern to transform the code for each instance of the bad pattern. Conventional software development tools lack the capability to address these problems.

Finally, software developers often produce reliable and proven program code segments that can be shared between projects and with other developers. Typically, the software developers need to document and advertise the use of this proven program code segment to propagate its continued use. In such cases, the software developer takes the manual steps to copy and paste the proven program code segment into a new project. Conventional software tools lack the ability to assist in automating and publicizing the available patterns/code segments. Thus, there is a need in the art for a tool that avoids the foregoing limitations of conventional software development tools.

SUMMARY OF THE INVENTION

Methods and systems consistent with the present invention provide an improved software development tool that overcomes the limitations of conventional software development tools. The improved software development tool generates a pattern instance to offer a tailored and documented pre-emptive solution to a common software design problem, applies a pattern to a portion of existing code to improve the design of existing code, and defines a user pattern from existing code to provide a developer with the capability to capture a proven pattern for reuse. Patterns that are generated or applied have pattern information embedded in an associated comment by the improved software development tool to allow these patterns to easily be detected both textually and through the graphical diagrams to facilitate communicating the pattern's existence an for future design improvements.

In accordance with methods and systems consistent with the present invention, a method is provided in a data processing system. The method receives an indication of a pattern, generates software code reflecting the pattern, and stores identification information for the pattern in a comment associated with the generated software code.

In accordance with methods and systems consistent with the present invention, a method is provided in a data processing system having a pattern The pattern has a participant playing a role in the pattern. The method receives an indication of the software element, determines whether the software element is capable of playing the role, and when it is determined that the software element is capable of playing the role, designates that the software element plays the role in the pattern.

In accordance with methods and systems consistent with the present invention, a method is provided in a data processing system. The method displays a plurality of software elements to a user, receives an indication of a selected one of the plurality of software elements, receives an indication of a user-defined pattern role that the selected software element plays in a pattern, and stores the plurality of software elements as the pattern.

In accordance with methods and systems consistent with the present invention, a method is provided in a data processing system having source code. The method detects a first pattern in the source code, and replaces the first pattern with a second pattern that is different than the first pattern.

Additional implementations are directed to systems and computer devices incorporating the methods described above. It is also to be understood that both the foregoing general description and the detailed description to follow are exemplary and explanatory only and are not restrictive of the invention, as claimed.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

Figure 1:
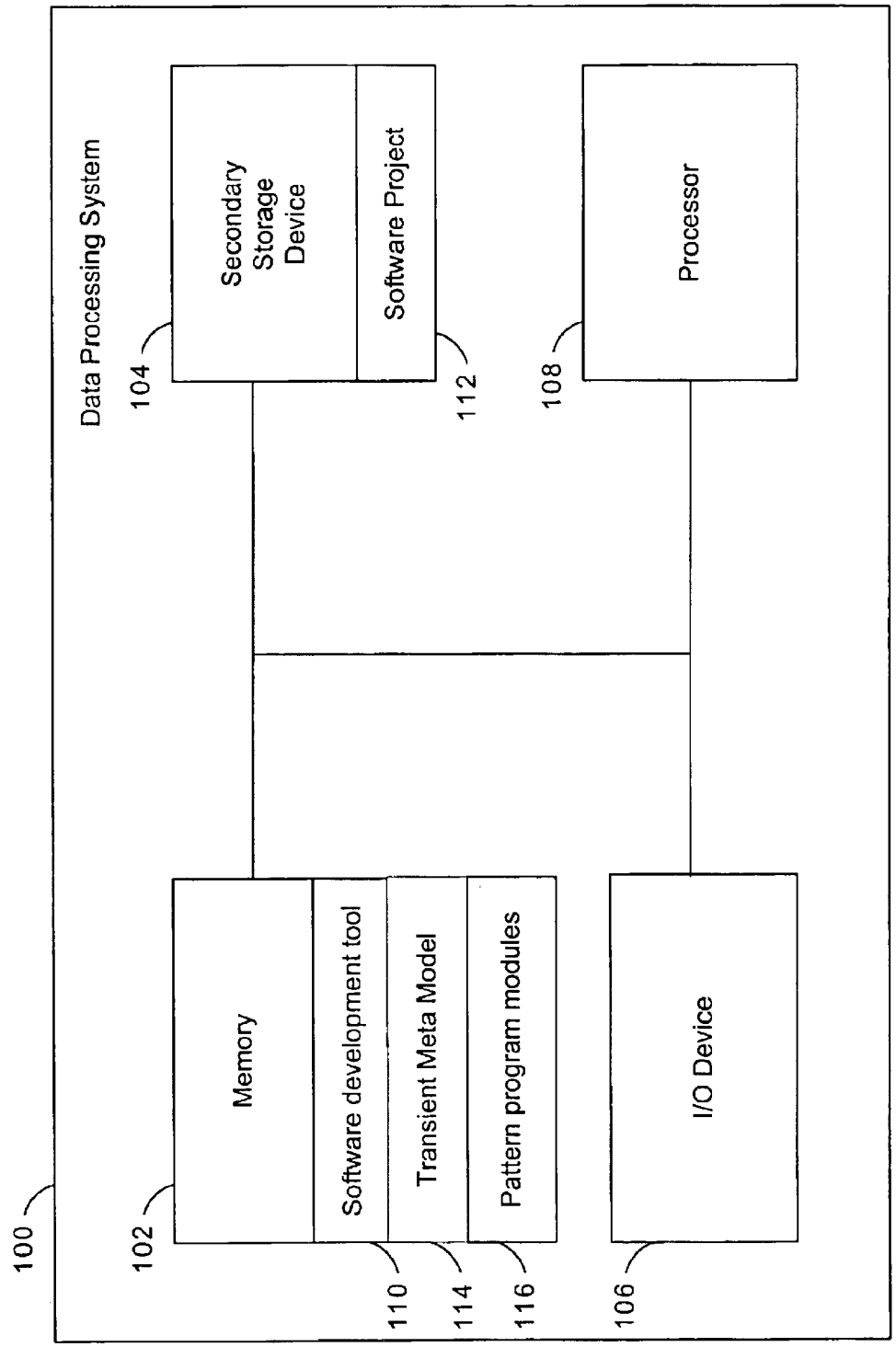
FIG. 1 depicts a block diagram of a data processing system suitable for practicing methods and systems consistent with the present invention.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE INVENTION

Methods and systems consistent with the present invention provide an improved software development tool that generates a pattern instance, that applies a pattern to a portion of existing code to improve the design of the existing code, and that can be used to create a new pattern from existing code. The improved software development tool saves development time and expense while promoting better design practices by allowing a developer to automatically generate a pattern on command and to automatically apply the pattern to existing code to improve the design of the code. Thus, this system enables the developer to avoid having to interpret and manually implement the pattern provided in a book, and to avoid the risk of incorrectly implementing the pattern. Furthermore, the improved software development tool enables a programmer to capture a good design and make it into a reusable pattern.

Patterns allow software developers to implement sound engineering architecture and design for resolving common, recurring problems encountered throughout all of software development. Through the use of pattern generation in accordance with methods and systems consistent with the present invention, a developer can organize, document, and produce more maintainable software. In addition, a developer can manually or automatically detect an undesirable pattern and transform the undesirable pattern into a desirable one.

Implementation Details

FIG. 1 depicts a data processing system 100 suitable for practicing methods and systems consistent with the present invention. Data processing system 100 includes a memory 102, a secondary storage device 104, an I/O device 106, and a processor 108. Memory 102 includes a software development tool 110 for generating, applying, and defining a pattern for a software project 112, which is stored in the secondary storage device 104. The software project 112 comprises source code in at least one file which, when compiled, forms a sequence of instructions to be run by the processor 108. Software development tool 110 also includes a transient meta model (TMM) 114 that is generated by the software development tool to store a language-neutral representation of the source code for the software project 112. Software development tool 110 further includes a plurality of pattern program modules 116 that contain instructions that the software development tool performs to generate or apply a respective pattern as described herein. One skilled in the art will recognize that data processing system 100 may contain additional or different components.

Although aspects of the present invention are described as being stored in memory, one skilled in the art will appreciate that these aspects can also be stored on or read from other types of computer-readable media, such as secondary storage devices (e.g., hard disks, floppy disks, or CD-ROM); a carrier wave from a network, such as the Internet; or other forms of RAM of ROM either currently known or later developed.

Generating a Pattern Instance

Figure 27:
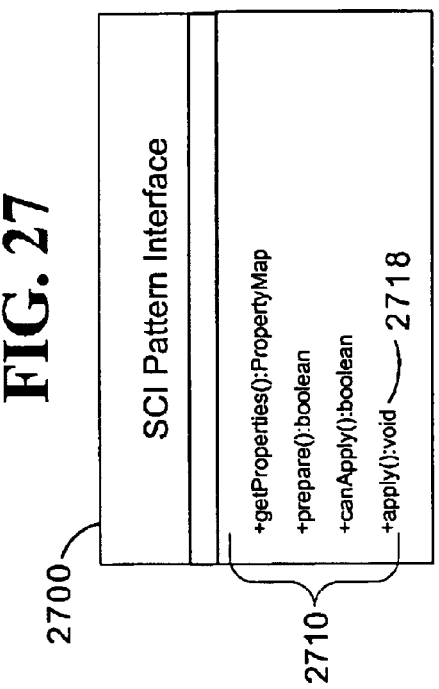
FIG. 27 depicts an exemplary dialog box that the software development tool in FIG. 1 may use to display a user identified pattern participant and to receive a role to be assigned to the identified pattern participant.

To generate a pattern instance, the software development tool 110 supports the fir definition of a pattern using programming language statements or instructions that are encapsulated in a program module for each pattern. The programming language may be any object-oriented programming language, such as the Java™ programming language or C++. The program module may be a class that is compiled with the software development tool 110. Alternatively, the program module may be a script file, which is well known in the art. The script file will be interpreted by the software development tool at runtime. For the software development tool to generate a pattern instance or apply a pattern to existing code as described below, each pattern implements methods 2710 defined in a Source Code Interface (SCI) pattern interface 2700 shown in FIG. 27. As described herein, the software development tool performs the apply method 2718 for a pattern to invoke the transient meta model (TMM) to create or change source code corresponding to the pattern in a software project 112.

Figure 28:
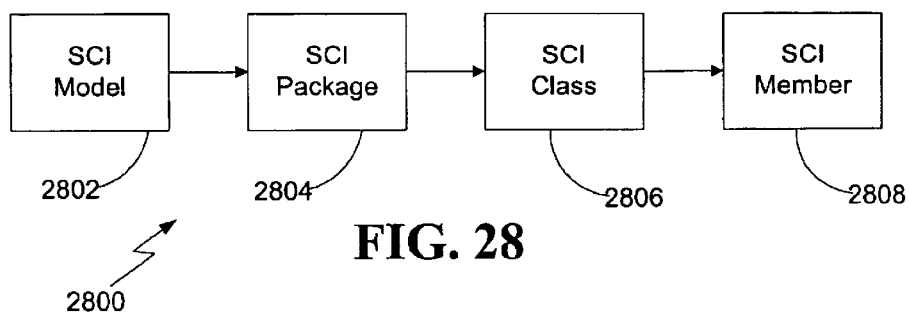
FIG. 28 depicts a data structure of the language-neutral representation created by the software development tool in FIG. 1.

The TMM that is generated by the software development tool is described in greater detail in U.S. patent application Ser. No. 09/680,063, entitled "Method And System For Developing Software," that has been previously incorporated by reference. The data structure 2800 of the language-neutral representation is depicted in FIG. 28. The data structure 2800 comprises a Source Code Interface (SCI) model 2802, an SCI package 2804, an SCI class 2806, and an SCI member 2808. The SCI model 2802 is the source code organized into packages. The SCI model 2802 corresponds to a directory for the software project 112 being developed by the user, and the SCI package 2804 corresponds to a subdirectory. As is well known in object-oriented programming, the class 306 is a category of objects which describes a group of objects with similar properties (attributes), common behavior (operations or methods), common relationships to other objects, and common semantics. The members 2808 comprise attributes and/or operations.

Figure 29:
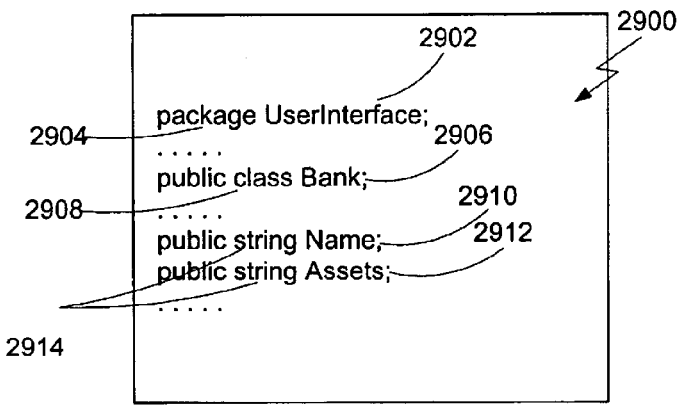
FIG. 29 depicts representative source code.
Figure 30:
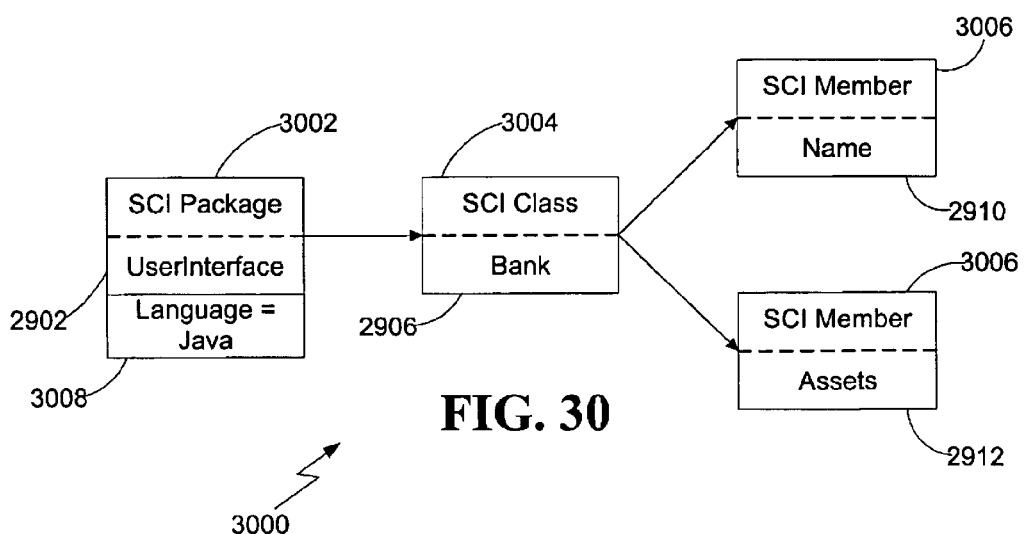
FIG. 30 depicts the data structure of the language-neutral representation of the source code of FIG. 29.

For example, the data structure 3000 for the source code 2900 shown in FIG. 29 is depicted in FIG. 30. UserInterface 2902 is defined as a package 2904. Accordingly, UserInterface 2902 is contained in SCI package 3002. Similarly, Bank 2906, which is defined as a class 2908, is contained in SCI class 3004, and Name 2910 and Assets 2912, which are defined as attributes (strings 2914), are contained in SCI members 3006. Since these elements are in the same project, all are linked and can be accessed by the software development tool. The data structure 3000 also identifies the language in which the source code is written 3008, e.g., Java™ programming language. The software development tool's utilization of the TMM to produce a customized design model and corresponding source code for a selected pattern is explained below with reference to FIG. 31.

The software development tool 110 hosts a substantial number of pattern definitions, including patterns attributable to the four software visionaries known as the "Gang of Four" (Erich Gamma, Richard Helm, John Vlissides, and Ralph Johnson) who published a popular authoritative text on design patterns. The Gang of Four patterns identified herein are more clearly described in Gamma, Erich, et al., *Design Patterns: Elements of Reusable Object-Oriented Software*, Addison-Wesley (1995), which is incorporated herein by reference. One skilled in the art will appreciate that the pattern generation performed by the improved software development tool is not limited to the Gang of Four patterns, but may also be used with other patterns.

One of the Gang of Four patterns is the Singleton pattern, which ensures that a class has only one instance and provides a global point of access to it. Therefore, clients (e.g., external classes or objects of classes) access a Singleton instance solely through Singleton's instance operation, which returns the one instance of the class. To illustrate the use of a Singleton pattern, the following problem scenario is given. Two objects of two different classes (i.e., two independent executable sections of code) both access a third object having an operation responsible to play an audio clip, the resulting sound is confusing as the two different audio clips are effectively played at the same time. Use of a Singleton class for the third class in this scenario prevents this problem from occurring. Because there is only one instance of the Singleton class for an object to call, only one of the two class objects can access the single instance of the Singleton class to play an audio clip at a given time. The components and variations of the Singleton pattern will be further explained below.

Figure 2:
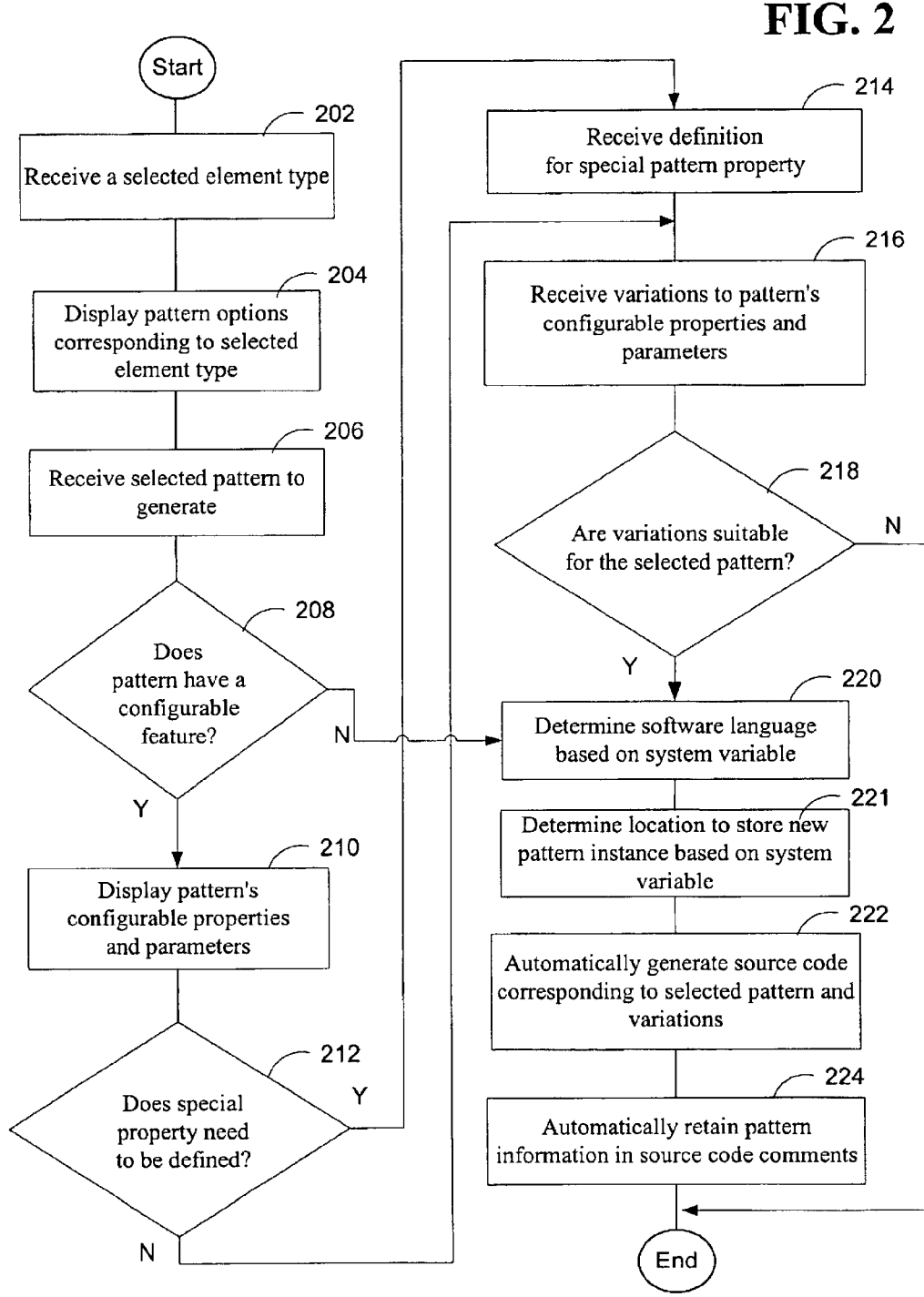
FIG. 2 depicts a flow chart illustrating an exemplary process performed by the software development tool in FIG. 1 for generating a pattern instance.

Turning to FIG. 2, an exemplary method in a data processing system for generating software code based on a pattern in accordance with the present invention is shown. To create an instance of a pattern in the software code, the software development tool 110 first receives an element type to distinguish the type of pattern that is to be created (step 202). The element type can be a class, a link, or any known object-oriented component (e.g., method or attribute) from which a new pattern instance can be created. A link is generally a structural relationship between classes, such as a single or bi-directional association, or an aggregation.

Figure 3:
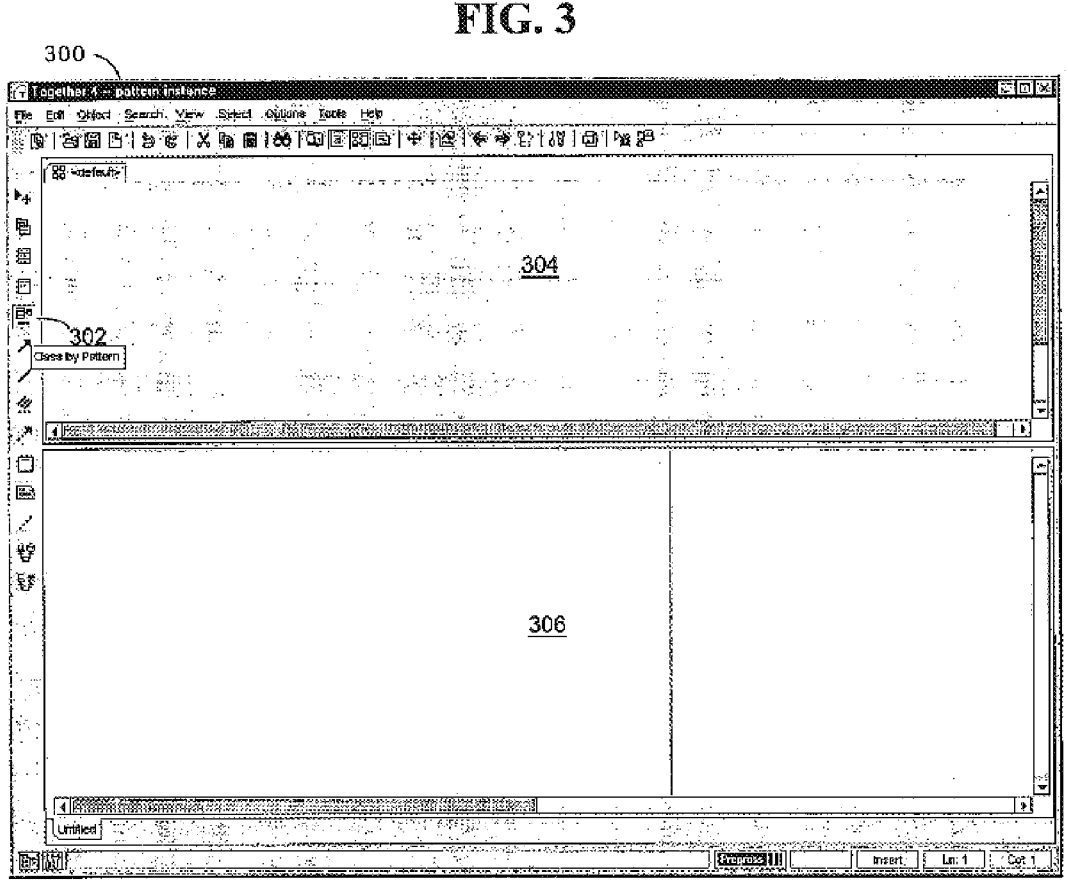
FIG. 3 depicts an exemplary GUI screen for initiating the generation of a pattern and for showing both a graphical and a textual view of the pattern instance generated by the software development tool in FIG. 1.

In one implementation, depicted in FIG. 3, the software development tool receives a selected element type (e.g., class) and is prompted to generate a pattern based on the selected element type by the activation of a respective radio button 302 on an exemplary GUI interface or screen 300. One skilled in the art will appreciate that any known programming technique for inputting data could be used to convey the same information to the software development tool. Screen 300 shows an empty graphical editor pane 304 and an empty source code editor pane 306 to illustrate a newly opened project 112 that does not yet contain any software code. Therefore, the TMM 114 will have an empty data structure 2800 until invoked by the software development tool to generate a pattern instance.

Figure 4:
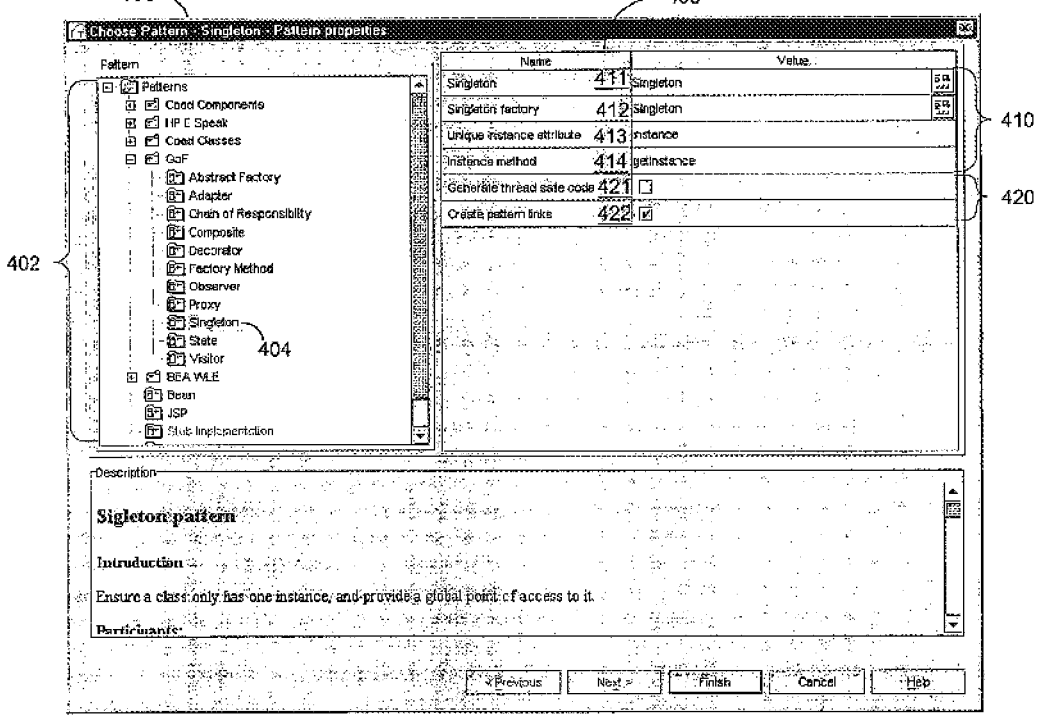
FIG. 4 depicts an exemplary screen showing a list of pattern options that the software development tool in FIG. 1 may generate based on a class element type and showing configurable properties and parameters that the software development tool in FIG. 1 may use to generate the selected pattern.

Referring back to FIG. 2, in response to the prompt to generate a pattern instance, the software development tool displays a list of pattern options that are applicable to the selected element type (step 204) and from which the developer can choose. An exemplary list of pattern options 402 that are applicable to generating a pattern based on class element type 302 is shown in FIG. 4. Examples of the well-known pattern options that may be applied to a class are also identified in Table 1 and Table 2 below with their respective definitions.

TABLE 1

Gang of Four Patterns For A Class

| Pattern Name | Pattern Description | Pattern Participant & Role |
|---|---|---|
| Abstract Factory | Provides an interface for creating families of related or dependent objects without specifying their specific classes. Use abstract factory pattern when • a system should be independent of how its products are created, composed, and represented. • a system should be configured with one of multiple families of products. • a family of related product objects is designed to be used together, and you need to enforce their constraint. • you want to provide a class library of products, and you want to reveal just their interfaces, not their implementations. | Abstract factory • declares an interface for operations that create Abstract product objects. • this participant cannot be read-only. Abstract product • declares an interface for a type of Product object. Concrete factory • implements the operations to create Concrete product objects. • this participant cannot be read-only. • this participant cannot be an interface. Concrete product • defines a product object to be created by the corresponding concrete factory. • implements the Abstract product interface. • this participant cannot be read-only. • this participant cannot be an interface. |
| Adapter pattern | Convert the interface of a class into another interface client expects. Adapter lets classes work together that couldn't otherwise because of incompatible interfaces. There are two variations of the adapter pattern: object adapter and class adapter: Use adapter pattern when • you want to use an existing class, and its interface does not match the one you need. • you want to create a reusable class that cooperates with unrelated or unforeseen classes, that is, classes that don't necessarily have compatible interfaces. • (object adapter only) you need to use several existing subclasses, but it's impractical to adapt their interface by subclassing every one. An object adapter can adapt the interface of its parent class. | Target • defines the domain-specific interface. • This participant cannot be a class if the class adapter (see below) version is chosen. Adaptee • defines an existing interface that needs adapting. Adapter • adapts the interface of adaptee to the target interface. • this participant cannot be an interface. • this participant cannot be read-only. |
| Chain of Responsibility pattern | Avoid coupling the sender of a request to its receiver by giving more than one object a chance to handle the request. Chain the receiving objects and pass the request along the chain until an object handles it. | Handler • defines an interface for handling requests. • implements the successor link. • this participant cannot be read-only. • this participant cannot be an interface. Concrete handler |

TABLE 1-continued

Gang of Four Patterns For A Class

| Pattern Name | Pattern Description | Pattern Participant & Role |
|---|---|---|
| | Use Chain of Responsibility when<br>• more than one object may handle a request, and the handler isn't known a priori. The handler should be ascertained automatically.<br>• you want to issue a request to one of several objects without specifying the receiver explicitly.<br>• the set of objects that can handle a request should be specified dynamically. | • handles requests it is responsible for.<br>• can access its successor.<br>• if the Concrete Handler can handle the request, it does so; otherwise it forwards the requests to its successor. |
| Composite pattern | Compose objects into tree structures to represent part-whole hierarchies. Composite lets clients treat individual objects and compositions of objects uniformly.<br>Use the Composite when<br>• you want to represent part-whole hierarchies of objects.<br>• you want clients to be able to ignore the difference between compositions of objects and individual objects. Clients will treat all objects in the composite structure uniformly. | Component<br>• declares the interface for objects in the composition.<br>• Implements default behavior for the interface common to all classes, as appropriate.<br>• Declares an interface for accessing and managing its child components.<br>• (optional) defines an interface for accessing a components parent in the recursive structure, and implements it if that's appropriate.<br>• This participant cannot be an interface.<br>Leaf<br>• represents leaf objects in the composition. A leaf has no children.<br>• defines behavior for primitive objects in the composition.<br>• this participant cannot be read-only.<br>• this participant cannot be an interface.<br>Composite<br>• defines behavior for components having children.<br>• stores child component.<br>• implements child-related operations in the Component interface.<br>• this participant cannot be read-only.<br>• this participant cannot be an interface. |
| Decorator pattern | Attach additional responsibilities to an object dynamically. Decorators provide a flexible alternative to subclassing for extending functionality.<br>Use Decorator<br>• to add responsibilities to individual objects dynamically and transparently, that is, without affecting other objects.<br>• for responsibilities that can be withdrawn.<br>• when extension by subclassing is impractical. Sometimes a large number of independent extensions are possible and would produce an explosion of subclasses to support every combination. Or a class definition may be hidden or otherwise unavailable for subclassing. | Component<br>• defines the interface for objects that can have responsibilities added to them dynamically.<br>• this participant cannot be read-only.<br>Concrete component<br>• defines an object to which additional responsibilities can be attached.<br>• this participant cannot be read-only.<br>Decorator<br>• maintains a reference to a Component object and defines an interface that conforms to Component's interface.<br>• this participant cannot be read-only.<br>• this participant cannot be an interface.<br>Concrete decorator<br>• adds responsibilities to the component.<br>• this participant cannot be read-only.<br>• this participant cannot be an interface. |
| Factory method pattern | Use the Factory Method pattern when<br>• a class can't anticipate the class of objects it | Product<br>• defines the interface of objects the factory method creates.<br>Concrete product |

TABLE 1-continued

Gang of Four Patterns For A Class

| Pattern Name | Pattern Description | Pattern Participant & Role |
|---|---|---|
| | creates.<br>• a class wants its subclasses to specify the objects it creates.<br>• Classes delegate responsibility to one of several helper subclasses, and you want to localize the knowledge of which helper subclass is the delegate. | • implements the Product interface.<br>• this participant cannot be read-only.<br>Creator<br>• declares the factory method, which returns an object of type Product. Creator may also define a default implementation of the factory method that returns a default Concrete Product object.<br>• may call the factory method to create a Product object.<br>• this participant cannot be read-only.<br>Concrete creator<br>• overrides the factory method to return an instance of a Concrete Product.<br>• this participant cannot be read-only.<br>• this participant cannot be an interface. |
| Observer pattern | Define a one-to-many dependency between objects so that when one object changes state, all its dependents are notified and updated automatically.<br>Use the Observer pattern in any of the following situations:<br>• When an abstraction has two aspects, one dependent on the other. Encapsulating these aspects in separate objects lets you vary and reuse them independently.<br>• When a change to one object requires changing others, and you don't know how many objects need to be changed.<br>• When an object should be able to notify other objects without making assumptions about who these objects are. In other words, you don't want these objects tightly coupled. | Subject<br>• knows its observers. Any number of Observer objects may observe a subject.<br>• provides an interface for attaching and detaching Observer objects.<br>• this participant cannot be read-only.<br>Observer<br>• defines an updating interface for objects that should be notified of changes in a subject.<br>• this participant cannot be read-only.<br>ConcreteSubject<br>• stores state of interest to ConcreteObserver objects.<br>• sends a notification to its observers when its state changes.<br>• this participant cannot be read-only.<br>• this participant cannot be an interface.<br>ConcreteObserver<br>• maintains a reference to a ConcreteSubject object.<br>• stores state that should stay consistent with the subjects.<br>• implements the Observer updating interface to keep its state consistent with the subjects.<br>• this participant cannot be read-only. |
| Proxy pattern | Provide a surrogate or placeholder for another object to control access to it. Proxy is applicable whenever there is a need for a more versatile or sophisticated reference to an object than a simple pointer. | Proxy<br>• maintains a reference that lets the proxy access the real subject. Proxy may refer to a Subject if the RealSubject and Subject interfaces are the same.<br>• provides an interface identical to Subject's so that a proxy can be substituted for the real subject.<br>• controls access to the real subject and may be responsible for creating and deleting it.<br>• other responsibilities depend on the kind of proxy:<br>• remote proxies are responsible for encoding a request and its arguments and for sending the encoded request to the real subject in a different address space.<br>• virtual proxies may cache additional information about the real subject so they can postpone accessing it.<br>• protection proxies check that the caller has the access permission required to perform a request.<br>• this participant cannot be read-only.<br>• this participant cannot be an interface.<br>Subject<br>• defines the common interface for RealSubject and Proxy so that a Proxy |

TABLE 1-continued

Gang of Four Patterns For A Class

| Pattern Name | Pattern Description | Pattern Participant & Role |
|---|---|---|
| | | can be used anywhere a RealSubject is expected.<br>• this participant cannot be read-only.<br>RealSubject<br>• defines the real object that the proxy represents.<br>• this participant cannot be read-only. |
| Singleton pattern | Ensure a class only has one instance, and provide a global point of access to it.<br>Use the Singleton pattern when<br>• there must be exactly one instance of a class, and it must be accessible to clients from a well-known access point.<br>• when the sole instance should be extensible by subclassing, and clients should be able to use an extended instance without modifying their code. | Singleton<br>• a class, which should be instantiated only once.<br>• this participant cannot be an interface.<br>Singleton Factory<br>• a class with a static method to instantiate Singleton.<br>• this participant cannot be read-only.<br>• this participant cannot be an interface.<br>The Singleton and Singleton Factory could be the same class. In this case, it will contain a static method to instantiate itself only once. |
| State pattern | Allow an object to alter its behavior when its internal states change. The object will appear to change its class.<br>Use the State pattern in either of the following cases:<br>• An object's behavior depends on its state, and it must change its behavior at runtime depending on that state.<br>• Operations have large, multipart conditional statements that depend on the object's state. This state is usually represented by one or more enumerated constants. Often, several operations will contain this same conditional structure. The State pattern puts each branch of the conditional in a separate class. This lets you treat the object's state as an object in its own right that can vary independently from other objects. | Context<br>• defines the interface of interest to clients.<br>• maintains an instance of a ConcreteState subclass that defines the current state.<br>• this participant cannot be read-only.<br>• this participant cannot be an interface.<br>State<br>• defines an interface for encapsulating the behavior associated with a particular state of the Context.<br>• this participant cannot be read-only.<br>ConcreteState<br>• each ConcreteState implements a behavior associated with a state of the context.<br>• this participant cannot be read-only. |
| Visitor pattern | Represent an operation to be performed on the elements of an object structure. Visitor lets you define a new operation without changing the classes of the elements on which it operates.<br>Use the Visitor pattern when an object structure contains many classes of objects with differing interfaces, and you want to perform operations on these objects that depend on their concrete classes. Many distinct and unrelated operations need to be performed on objects in an object structure, and you want to avoid "polluting" their classes with these operations. Visitor lets you keep related operations together by defining them in one class. When the | Visitor<br>• declares a Visit operation for each class of ConcreteElement in the object structure. The operation's name and signature identifies the class that sends the Visit request to the Visitor. That lets the Visitor determine the concrete class of the element being visited. Then the Visitor can access the element directly through its particular interface.<br>• this participant cannot be read-only.<br>Visitor Adapter<br>• provides trivial implementation for each Visitor's operation.<br>• this participant cannot be read-only.<br>• this participant cannot be an interface.<br>Concrete Visitor<br>• implements each operation declared by Visitor. Each operation implements a fragment of the algorithm defined for the corresponding class of object in the structure. Concrete Visitor provides the context for the algorithm and stores |

TABLE 1-continued

Gang of Four Patterns For A Class

| Pattern Name | Pattern Description | Pattern Participant & Role |
|---|---|---|
| | object structure is shared by many applications; use Visitor to put operations in just those applications that need them. The classes defining the object structure rarely change, but you often want to define new operations over the structure. Changing the object structure classes requires redefining the interface to all visitors, which is potentially costly. If the object structure classes change often, then it's probably better to define the operations in those classes. | its local state. This state often accumulates results during the traversal of the structure.<br>• this participant cannot be read-only.<br>• this participant cannot be an interface.<br>Element<br>• defines an accept operation that takes a visitor as an argument.<br>Concrete Element<br>• implements an accept operation that takes a Visitor as an argument.<br>• this participant cannot be read-only.<br>• this participant cannot be an interface. |

TABLE 2

Additional Patterns To Be Applied To A Class

| Pattern Name | Pattern Description | Pattern Participant & Role |
|---|---|---|
| Bean pattern | This pattern can be used to modify existing class or to create a new public class so that it will contain user-specified bean properties. | Single Bean Class<br>For each property the pattern creates an attribute (its visibility is controlled by the "Set visibility" option) used to store the property value. Such attributes are initialized in the constructor.<br>The "Generate get methods" and "Generate set methods" options control whether to create "get" or "set" accessors to the created properties. |
| JavaServer Pages Pattern | This pattern can be used to generate JavaServer Page content file to display properties of beans. To take full advantage of this pattern, you must have the beans to display in your JSP-capable webserver classpath. | |
| Description Archetype | A catalog-entry-like description. A collection of values that apply again and again. Provides behavior across the collection of all things that correspond to its description. For example, your red pickup is a vehicle; it's a thing with its own serial number (called a vehicle identification number), purchase date, color, and odometer reading. The corresponding catalog-entry-like description is vehicle description; it establishes manufacturer, model number, date of manufacture, and available colors; it also is a good place to locate business-related methods like, "how many of these trucks are in good working order?" | Typical Attributes<br>• type-unique number, code or name for the type of objects described, e.g. Power Pick Up.<br>• Description-text description of the type of objects described, e.g. Long wheelbase, large engine.<br>• itemNumber-analogous to a catalog entry number.<br>• defaultValue-contains default value for an attribute in a corresponding PartyPlaceThing, Role or MomentInterval.<br>Typical Methods<br>Descriptions often include methods like how many are available and calculate total for quantity. Use a plug-in point when it has algorithmically complex behavior and we want the option of plugging in an alternative behavior at times.<br>• findAvailable-locate a PartyPlaceThing that is available (to play a particular Role in a particular MomentInterval).<br>• calcQtyAvailable-count the PartyPlaceThings available (to play a particular Role in a particular MomentInterval).<br>• defaultAlgorithm-some sort of |

TABLE 2-continued

Additional Patterns To Be Applied To A Class

| Pattern Name | Pattern Description | Pattern Participant & Role |
| --- | --- | --- |
| | | calculation.<br>• invokePlugInElseDefaultAlgorithm-if plugin supplied then invoke it or else invoke the defaultAlgorithm. |
| MomentInterval Archetype | Represents something that needs to be worked with and tracked for business or legal reasons that occurs at a moment in time, or over an interval of time. Either a moment or an interval of importance in the problem domain. A sale is made at a moment in time, the date and time of that sale. A rental happens over an interval of time, from checkout to check-in. A reservation occurs over an interval of time, from the time that it is made until the time it is used, canceled, or expires. A sale could even be an interval of time, if you track the duration of the sale for performance assessments. What's important is that it is one of these two, not which one of the two it is. | Typical Attributes<br>• number-unique identifying number used by external entities to reference a specific instance of the class.<br>• dateOrDateTimeOrInterval-time of moment or duration of interval.<br>• priority-e.g., high, normal, low.<br>• total-cached result from a calcTotal method (for performance to prevent necessary iteration across MI's).<br>• status-e.g., for a LoanApplication one of New, Submitted, Approved, Rejected, etc.<br>Typical Methods<br>• makeMomentInterval-supports the business process for making one, that is.<br>• addDetail-adds details (parts).<br>• calcTotal-interacts with its parts to calculate its total.<br>• recalcTotal-recalculates its total (forcing a recalculation, regardless of any internally buffered value).<br>• complete-complete the MomentInterval.<br>• cancel-cancel the MomentInterval.<br>• mi_generateNext-generate next (subsequent) MomentInterval.<br>• mi_assessWRTPrior-assess with respect to prior moment-intervals.<br>• mi_assessWRTSubsequent-assess with respect to subsequent moment-intervals.<br>• mi_comparePlanVsActual-compare MI's representing the planned with MI's representing the actual.<br>• listMomentIntervals-class/static method: list all of the moment-interval objects.<br>• calcAvgMomentInterval-class/static method: calculate the average moment-interval (usually average amount, although it could be something like average weight or average fulfillment time). |
| PartyPlaceThing Archetype | A party (meaning, a person or an organization), place or thing is someone or something who plays different roles. A person might be both an employee and a customer. A place might be both a retail outlet and a wholesale outlet. A thing might play a role in a manufacturing process and a different role in a purchasing process. Things often act as containers for other objects and usually include methods like assess performance or assess value. | Typical Attributes<br>• serialNumber-uniquely identifies an instance of this class, e.g., vehicle identification number, social security number.<br>• address-contact information: postal address, e-mail address, phone numbers.<br>• customValue-values differing from the default for this type of object (defaults in corresponding Description).<br>Typical Methods<br>• isAvailable-determines if it's currently available (checking status or interacting with its Roles).<br>• getCustomElseDefaultValue-gets its custom value or if not present asks its corresponding Description for its default value.<br>• assessValueToBusiness-assesses its value to the business (by interacting with its yellow roles). |

TABLE 2-continued

Additional Patterns To Be Applied To A Class

| Pattern Name | Pattern Description | Pattern Participant & Role |
|---|---|---|
| | | • assessPerformance-assesses its performance (by interacting with its yellow roles). |
| Role archetype | Role is a way of participation by a party (person or organization), place or thing. Many times persons or organizations are eligible to play the same role (for example, owner) within a problem domain that we are working in. So we model the role-player (a party, place, or thing) as well as the role (the "hat" that the party, place, or thing is wearing). The role player captures core attributes and behaviors that apply no matter what combination of hats it might be wearing. For person, that often includes attributes like legal name and date of birth. It also includes methods that enforce business rules across the collection of roles being played, for example, a method "authorized for" that interacts with each role and applies rules across that collection of roles to determine if it is authorized to take a given action. Party, person, and organization roles are the norm. Occasionally you'll find place and thing roles too (for example, a product and its two roles, "product in a sales process" and "product in use"). | Typical Attributes<br>• status<br>Typical Methods<br>• assessAcrossMIs<br>• listMI<br>• listRoles<br>• assessAcrossRoles |
| Class Stub implementation pattern | This useful pattern can be applied to a class in order to create stubs for all the methods found in interfaces (and their parent interfaces) this class implements. If a class extends another class, then this pattern creates stubs for all the constructors found in the superclass. These constructor stubs simply call the corresponding constructors in the superclass. | |

The software development tool also provides an option to display all pattern options prior to receiving a selected element type. After a pattern selection is made in this implementation, the software development tool may prompt the developer for information regarding the element type necessary to implement an instance of the selected pattern for the developer's current software development project, i.e., to generate the corresponding code.

The software development tool receives a pattern selected by the developer 206. Based on the pattern selected by the developer, the software development tool determines whether the pattern has configurable features (step 208) and, if so, displays them for the developer to complete or modify (step 210). A configurable feature defines a variation of the pattern. A configurable feature is a property or a parameter of the pattern that a developer can modify or select to tailor the pattern that is created. A configurable property may be an identification of a role for a pattern participant, or an attribute or method associated with a pattern participant. To adhere to the definition of the selected pattern, the software development tool uses default entries for configurable properties to complete or generate the pattern instance when the developer does not provide any modifications. Parameter options control whether a feature of a selected pattern definition is to be applied in generating the selected pattern instance as explained below.

As depicted in FIG. 4, in response to the selection of a Singleton pattern 404, the exemplary parameterization dialog box 405 displays configurable properties 410 and parameters 420. Singleton configurable properties 410 include: a name for a Singleton class 411 to be generated, a name for a Singleton factory 412 which has a static method to instantiate Singleton (this property causes a variation in how the Singleton pattern is applied, as explained below), the name of the unique instance attribute or variable 413 that refers to the one instance of the class to be utilized by other objects, and the name of the instance method or operation 414 to access and return a reference to the unique instance attribute 413 (e.g., returns a reference to Singleton object for this example). One skilled in the art will appreciate that configurable properties 410 correspond to various elements used for generating the selected pattern.

Singleton parameters 420 include "Generate thread safe code" option 421, and "Create pattern links" option 422. "Generate thread safe code" option 421, when selected, ensures that the pattern (e.g., Singleton) object behaves correctly in a multi-threaded environment by using a synchronized block in the instance method 414. A thread is a path of execution, and a program may have more than one thread. A synchronized block is a Java construct that prevents a simultaneous access of a block of code by multiple threads. The "Create pattern links" option 422, when selected, generates pattern information (e.g., see FIG. 9, Singleton pattern information 912), such as dependency links that identify relationships between classes and interfaces participating in the pattern. Pattern information is embedded in a comment field associated with a respective pattern element or participant so that a pattern instance can later be easily identified in the corresponding source code. Embedding pattern information will be further described below.

Figure 5:
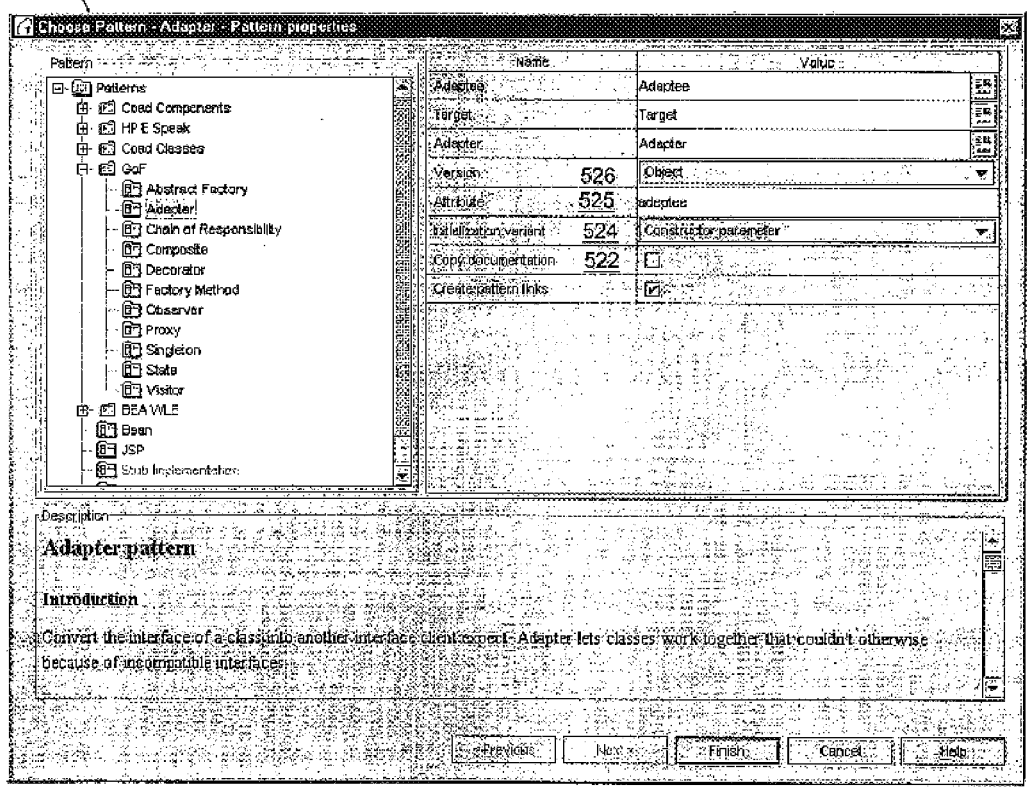
FIG. 5 depicts an exemplary screen showing other configurable properties and parameters that the software development tool in FIG. 1 may use to generate an adapter pattern.

Other parameters, depicted on screen 500 in FIG. 5, which may be displayed (depending on the design of the selected pattern) include: "Copy documentation" 522, "Initialization variant" 524, and "Version" 526. Copy documentation 522 controls whether to copy comments from methods in interfaces participating in the pattern to the stubs of these methods made by the pattern in classes implementing such interfaces. Initialization variant 524 defines the kind of initialization for an attribute of a pattern participant. For example, in the previously introduced adapter pattern, the adapter class has an attribute 525 that is initialized based on a call from a "set method" or based on a "constructor parameter" for an object of the adapter depending on the selection for the Initialization variant 524. Version 526 defines whether an object or a class variation of a selected pattern is to be generated.

Figure 6:
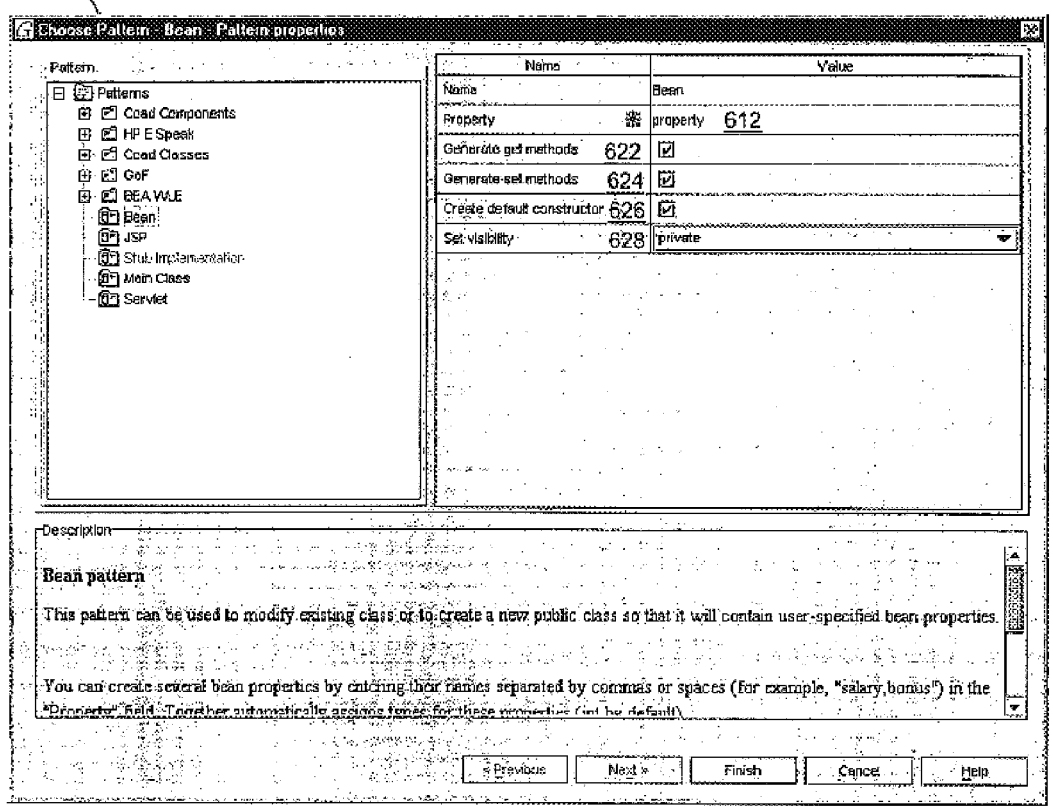
FIG. 6 depicts another exemplary screen showing other configurable properties and parameters that the software development tool in FIG. 1 may use to generate a Java Bean pattern.

Additional parameters, depicted on screen 600 in FIG. 6, which are primarily for generating a Java Bean instance include "Generate get methods" 622, "Generate set methods" 624, "Create default constructor" 626, and "Set visibility" 628. A Java Bean is a software component built using the Java™ programming language that is designed to be used in Java programs and manipulated in a Java Graphical User Interface (GUI) builder tool. In general, the software component is a self-contained group of software elements that can be controlled dynamically and assembled to form applications by the Java GUI builder tool. A Java Bean is more clearly described in Robert Englander, *Developing Java Beans*, O'Reilly (1997). Generate get methods 622 and Generate set methods 624 control whether to create "get" or "set" accessor methods for a specified property 612 in a Java Bean pattern. Create default constructor 626 controls whether the software development tool automatically creates a constructor to initialize an attribute or variable for the specified property. Set visibility 628 controls whether the attribute for the specified property 612 is privately accessible, protected but capable of being accessed by a subclass, locally accessible to objects in the same package, or publicly accessible. As is well known in object-oriented programming, a package is a library of classes grouped together based on common functionality, like performing I/O.

Figure 7:
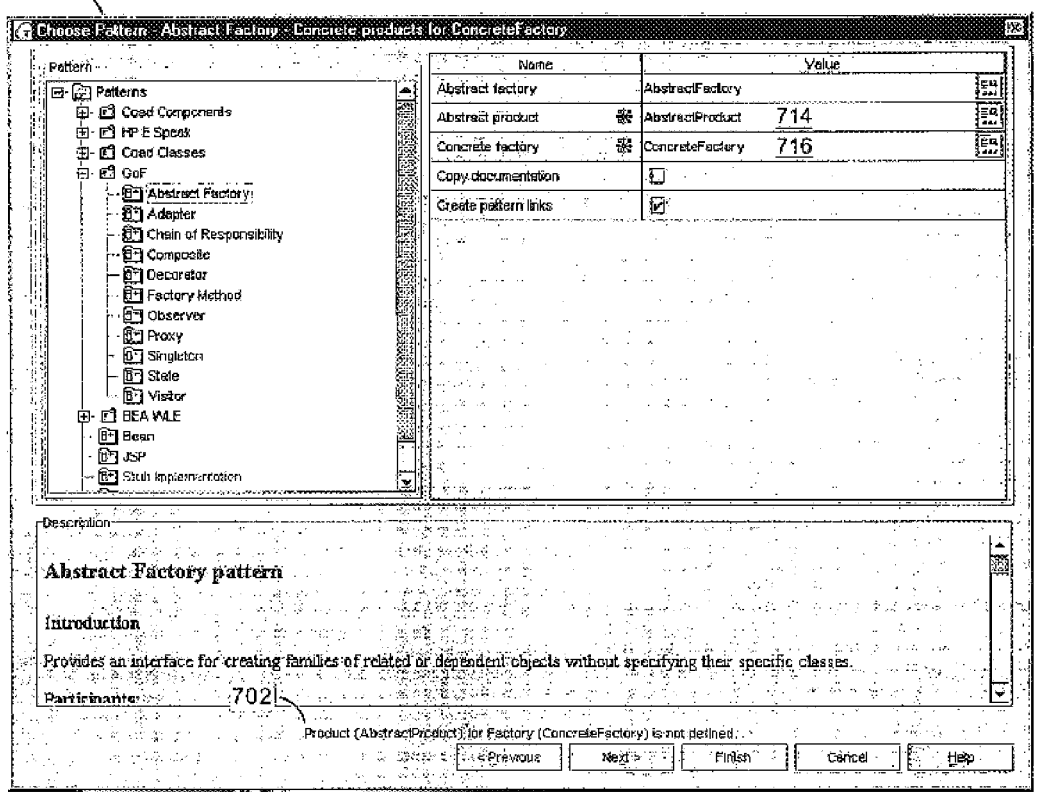
FIG. 7 depicts an exemplary screen showing a request by the software development tool in FIG. 1 to provide a special pattern property in order to generate a specific pattern.
Figure 8:
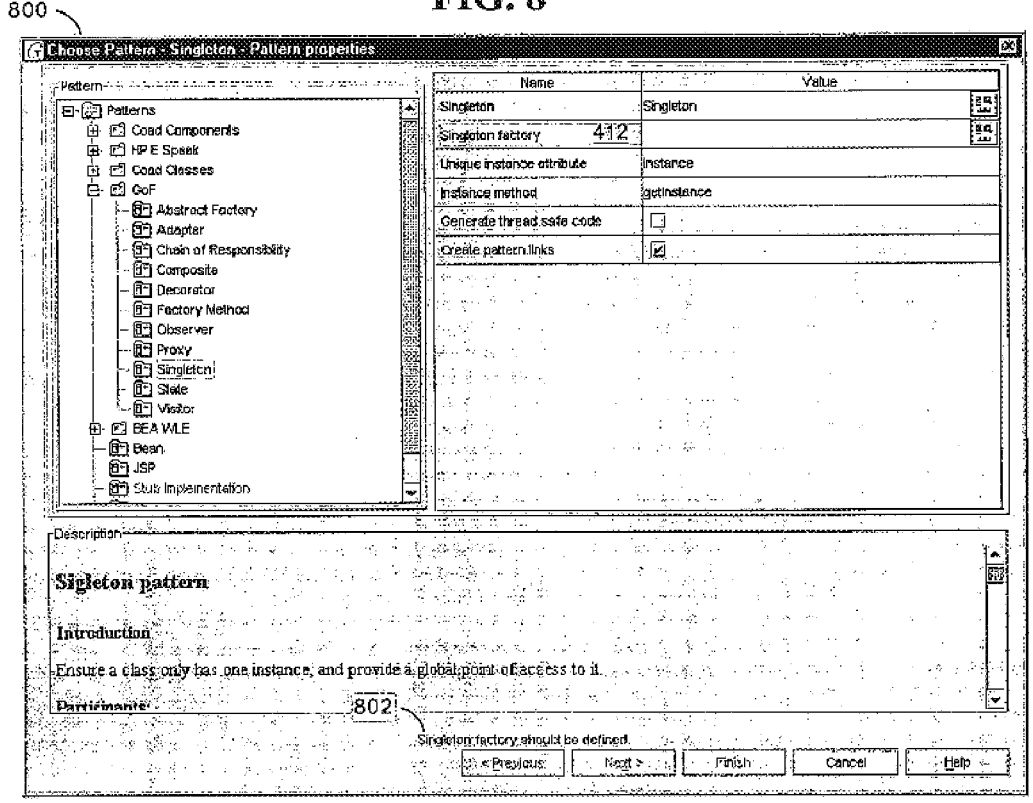
FIG. 8 depicts an exemplary screen showing an example response from the software development tool in FIG. 1 after determining that a selected pattern with a variation based on a change to configurable properties or parameters may not be applied to the selected element.

Returning to FIG. 2, after displaying the selected pattern's configurable properties and parameters in step 210, the software development tool determines whether a special pattern property needs to be defined (step 212) and, if necessary, receives the special pattern property prior to generating the selected pattern instance (step 214). A special pattern property is a property that the software development tool expects the developer to provide because the software development tool cannot deduce a default entry. As depicted on screen 700 in FIG. 7, a special pattern property is defined for generating an abstract factory pattern instance. In this example, the special pattern property for this pattern, which the software development tool asks to be defined, is the identification of a concrete product (see message 702). The yet to be identified concrete product will implement the interface of abstract product 714 and will have its objects created by concrete factory 716. In this example, the developer is prompted on another screen for the name of an existing class element or a new class element to be created as part of the pattern that will fulfill the role of the concrete product.

As shown in FIG. 2, if a developer makes any entries or modifications (i.e., variations from default values) to the selected pattern's configurable parameters or properties, the software development tool receives the variations (step 216) and determines whether the selected pattern with the variations can be applied to the selected element (step 218). To determine whether the variation is suitable, the software development tool checks the variation for syntax errors and for semantic errors such as a duplicate name for two properties that need to remain unique. In addition, the software development tool will check the selected pattern with the variation for completeness. For, example, screen 800 illustrates that a variation of removing and not replacing the default entry or identification for the Singleton factory 412 is not permitted (see message 802). The Singleton pattern cannot be generated unless the Singleton Factory 412 property or role is supplied by the developer to complete the pattern.

Figure 9:
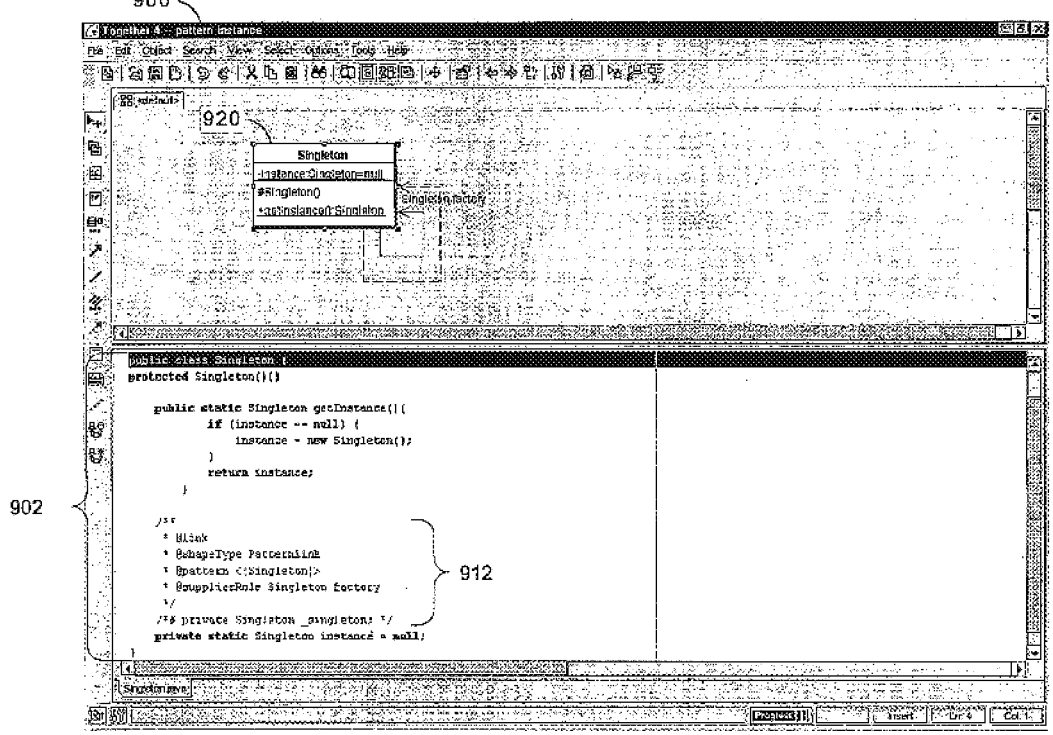
FIG. 9 depicts an exemplary screen showing the source code generated by the software development tool in FIG. 1 in response to the selected Singleton pattern of FIG. 4 with the variation that Singleton and Singleton Factory properties have the same value.
Figure 10:
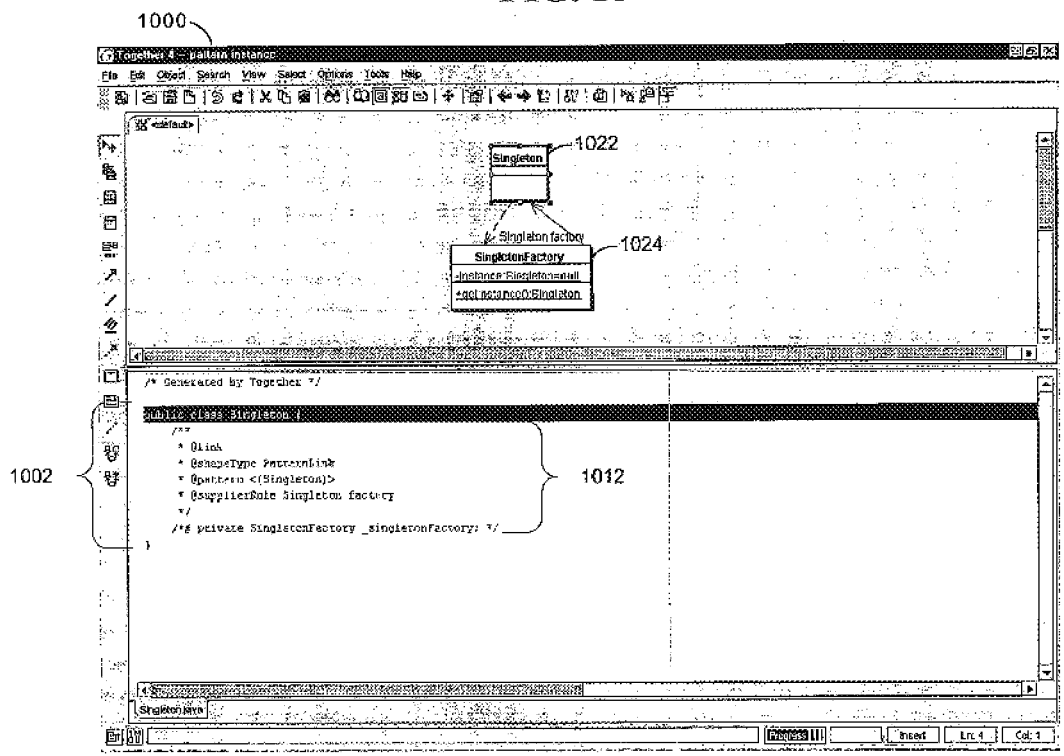
FIG. 10 depicts an exemplary screen showing the source code for the Singleton class generated by the software development tool in FIG. 1 in response to the selected Singleton pattern of FIG. 4 with the variation that Singleton and Singleton Factory properties do not have the same value.
Figure 11:
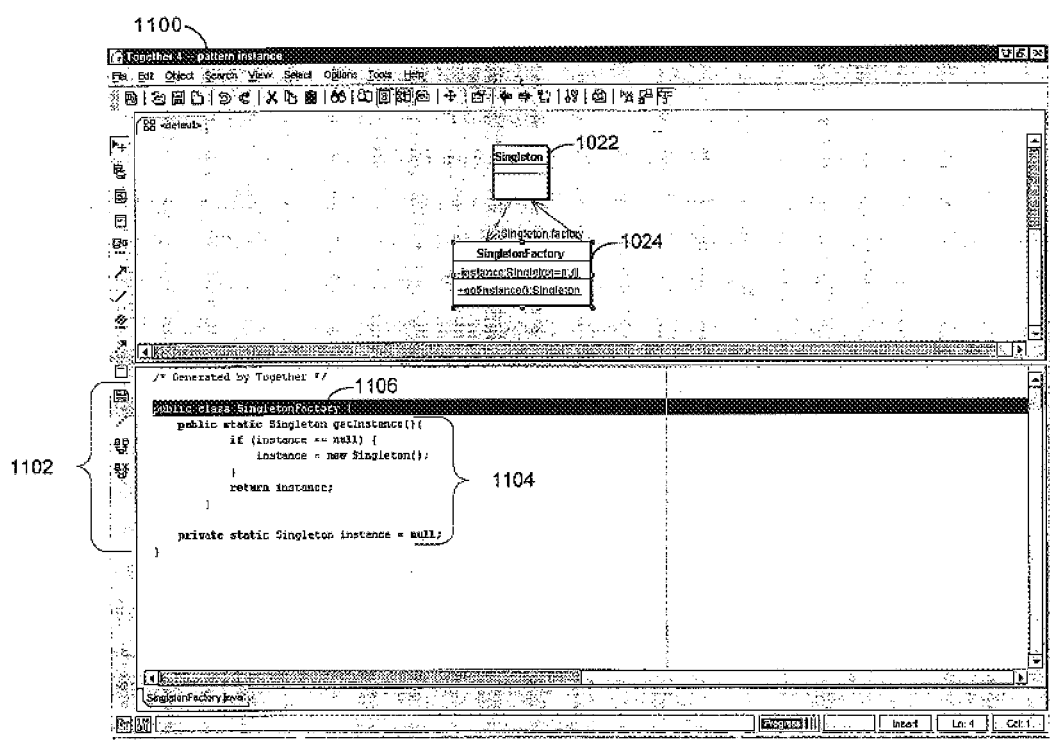
FIG. 11 depicts an exemplary screen showing the source code for the Singleton Factory class generated by the software development tool in FIG. 1 in response to the selected Singleton pattern of FIG. 4 with the variation that Singleton and Singleton Factory properties do not have the same value.

As shown on screen 400 in FIG. 4, Singleton 411 and Singleton Factory 412 have the same value, which results in a single class having a method to instantiate itself only once as shown in FIG. 9. Singleton Factory 412, however, may be given a different value (e.g., the name Singleton Factory) which results in a variation in the Singleton pattern instance that is generated as illustrated in FIGS. 10 and 11. Thus, each pattern has a plurality of variations based on configurable properties and parameters associated with each pattern.

If the selected pattern does not have any configurable properties, then the software development tool determines the software language in which the pattern is to be generated (step 220) For example, standard programming policy for the developer's company may fix properties for a pattern like the "stub implementation" pattern. When a selected pattern instance is to be applied to a new project, the software development tool references a language variable associated with the new project to identify the default software language to use in generating the selected pattern instance. For instance, the language variable may identify the software language to be the Java™ programming language or C++. Similarly, the software development tool references a path variable associated with the new project to identify the location to store the new pattern instance (step 221). In one implementation, both the language variable and path variable may be accessed and modified by a developer.

Figure 31:
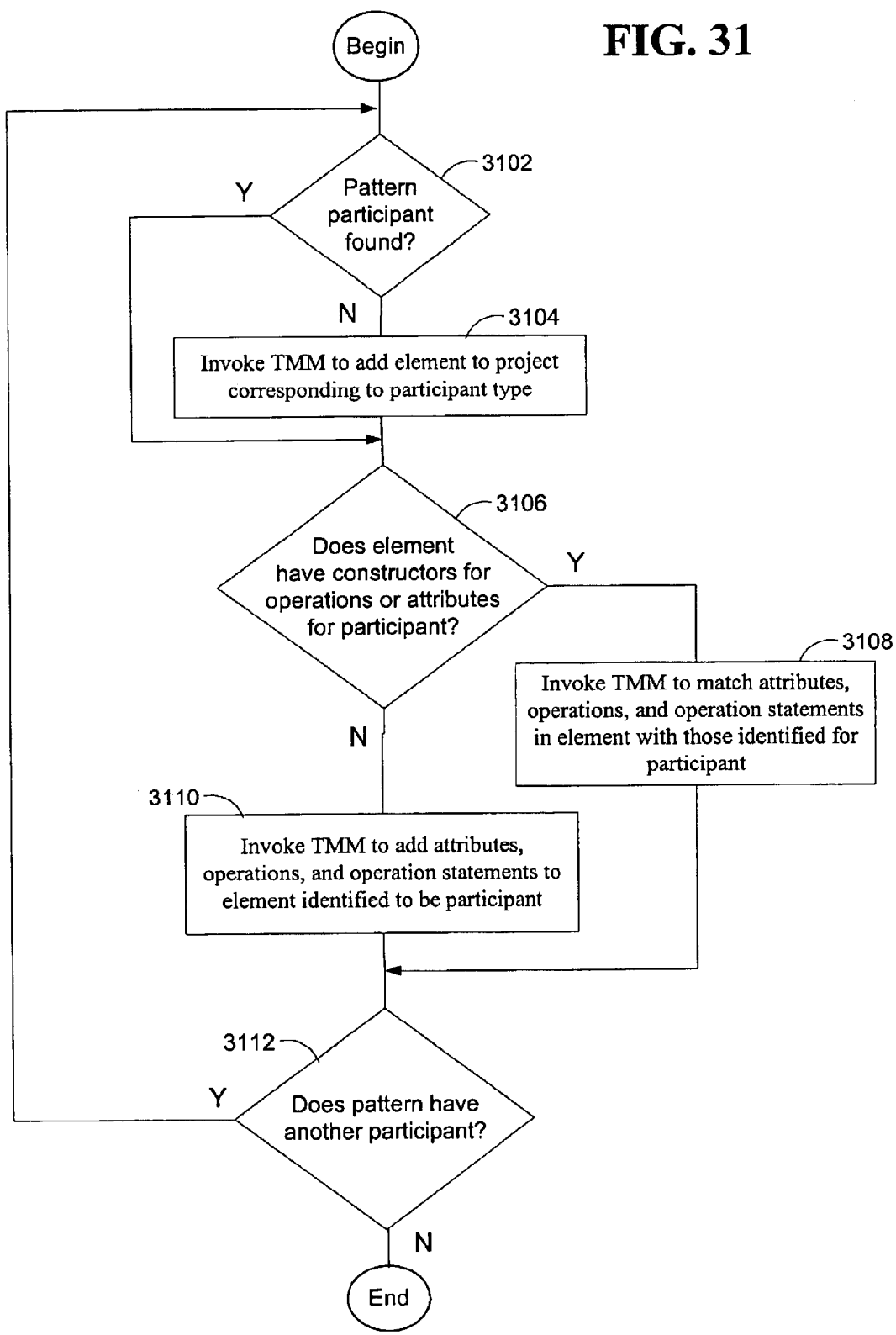
FIG. 31 depicts a flow chart illustrating an exemplary process performed by the software development tool in FIG. 1 to produce pattern code.

Once the applicable software language has been identified, the software development tool generates source code corresponding to the selected pattern and received variations (step 222). FIG. 31 depicts a flow chart illustrating an exemplary process performed by the software development tool to produce pattern code. Initially, the software development tool determines whether the participant has already been found in the source code for the project 112 (step 3102). Because the software development tool is generating a new instance of the selected pattern for the project 112, the TMM 114 data structure is empty or does not yet contain code corresponding to a participant in the pattern. Consequently, the software development tool invokes the TMM 114 to add an element to the project 112 corresponding to a participant type to be created, such as a class for the Singleton participant (step 3104). The software development tool next determines whether the element now identified as a pattern participant has constructors for operations or attributes associated with the pattern participant (step 3106). As described below in context with applying a pattern to an element within existing code, the software development tool invokes the TMM to match attributes, operations, and operation statements in an element that has been identified as a pattern participant and that has at least some constructors associated with the pattern (step 3108). When generating a new pattern instance, the element that is added as a pattern participant does not yet contain any constructors so the software development tool invokes the TMM to add attributes, operations, and operation statements to the newly added element that correspond to the role of the participant (step 3110). Finally, the software development tool determines whether the pattern has another participant for which the steps 3102–3110 need to be repeated (step 3112).

In FIG. 9, the exemplary screen 900 shows the source code 902 generated in response to the selected Singleton pattern of FIG. 4 with the variation that Singleton 411 and Singleton Factory 412 have the same value (i.e., attributes and operations of these two pattern participants are assigned to the same class element). The single class diagram 920 graphically reflects the generation of the selected Singleton pattern with the same variation. In FIGS. 10 and 11, the screens 1000 and 1100 illustrate the source code 1002 and source code 1102 generated in response to the selected Singleton pattern with the variation that Singleton 411 and Singleton Factory 412 have different values (e.g., participants given same name as the respective property or role). In this scenario, the attributes and operations 1104 for the Singleton pattern have been automatically generated in association with the source code 1102 for Singleton Factory class 1106. The class diagrams 1022 and 1024 graphically reflect the generation of the selected Singleton pattern with this variation.

Finally, as previously mentioned, pattern identification information is retained automatically by storing the identification information for the selected pattern in a comment associated with the generated software code based on the selected pattern (step 224). Returning to FIGS. 9 and 10, the pattern identification information 912 and 1012 identify the pattern, the role of a supplier of the class instance (Singleton Factory), and the name of the supplier participant playing the role (Singleton in FIG. 9, and Singleton Factory in FIG. 10).

Because the pattern information is embedded in source code comments, documentation generation and future modifications or improvements to a program for a project can be facilitated as the pattern within the code is made recognizable. As explained below, the software development tool can automatically detect undesirable code and transform it to improved code corresponding to a selected pattern. By embedding pattern information in source code comments, the generated pattern can later be identified as undesirable code, which can be easily located from among all other code in a program.

For example, a developer may utilize a Singleton pattern to ensure that only one instance of a class is created when the code for a particular project is compiled and executed. While this may have been a good design decision at the time, there may be reasons to improve the design, like improving the performance of the code which lead the developer to identify the Singleton as a bad pattern for the code. Applying another pattern or an improved version of the Singleton pattern to replace the originally generated pattern is supported by the software development tool as explained in context with "Applying A Pattern To Existing Code," below.

Figure 12:
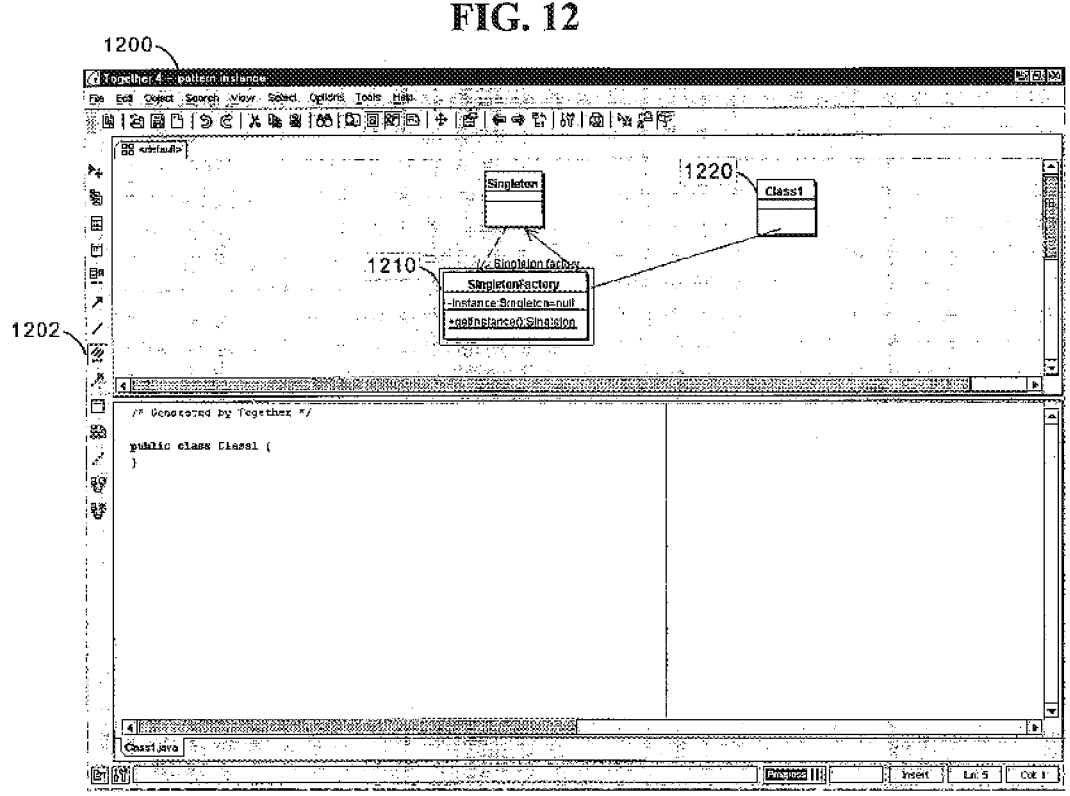
FIG. 12 depicts an exemplary GUI screen for initiating the generation of a link pattern and for identifying the two nodes between which the software development tool in FIG. 1 will generate a selected link pattern.

The software development tool is not limited to generating a pattern based on a selected class element type. For example, screen 1200 in FIG. 12 depicts an exemplary GUI screen for initiating the generation of a link pattern and for identifying the two nodes (a node may be a class or an interface) between which the software development tool will generate a selected link pattern. In this implementation, the software development tool receives a link element type and is prompted to generate a pattern for the selected element type based on the actuation of a respective radio button 1202 and by the identification of the node 1210, SingletonFactory class, and the node 1220, Class 1.

Figure 13:
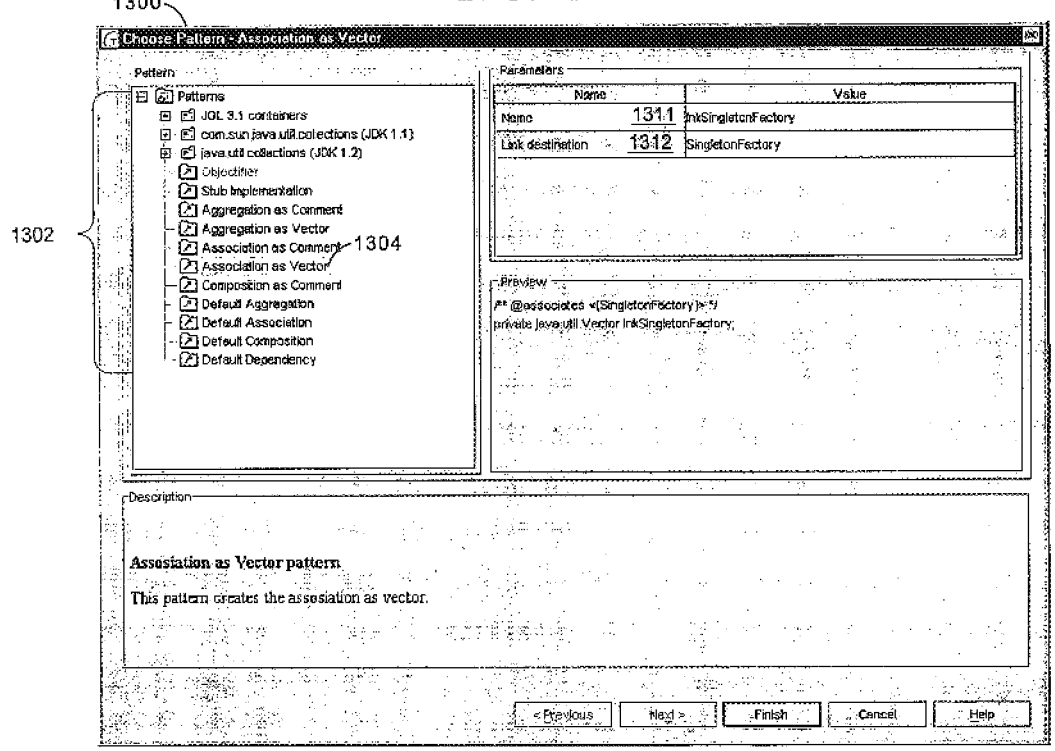
FIG. 13 depicts an exemplary screen showing a list of pattern options that the software development tool in FIG. 1 may generate based on a link element type, and showing configurable properties and parameters that the software development tool in FIG. 1 may use to generate the selected pattern.
Figure 14:
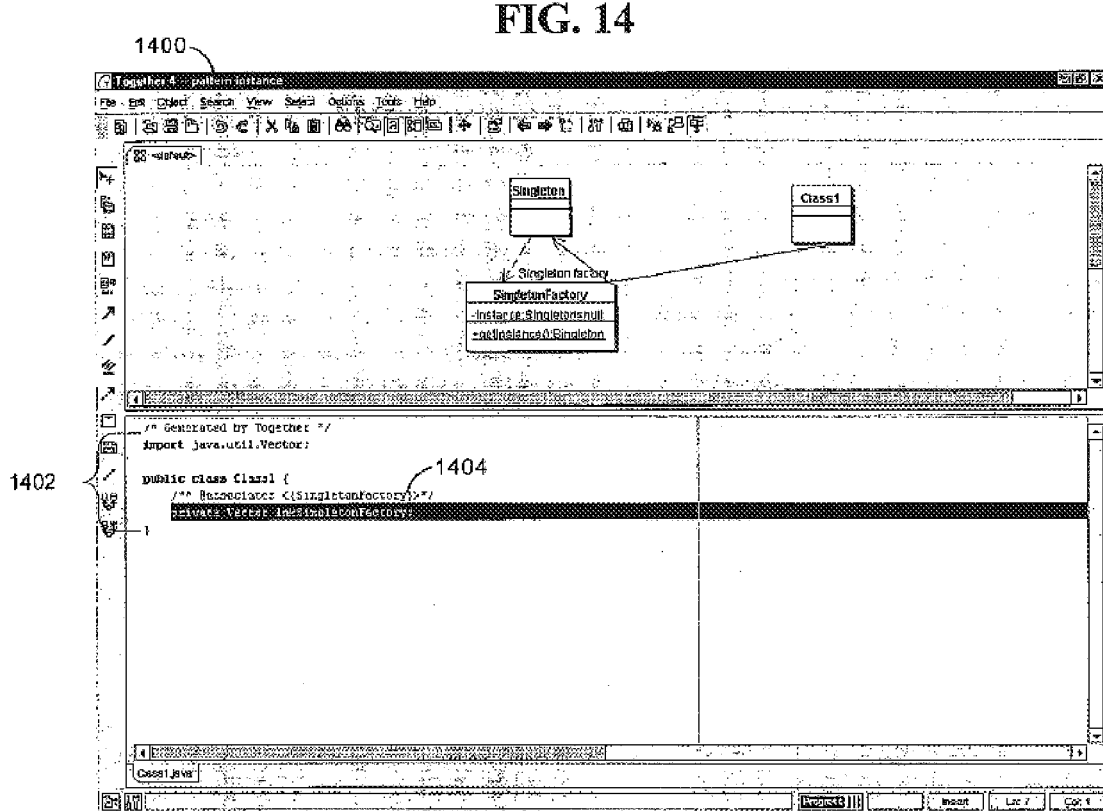
FIG. 14 depicts an exemplary screen showing the source code generated by the software development tool in FIG. 1 in response to the selected pattern of FIG. 13.

To generate a link pattern, the software development tool 110 performs the process steps shown in FIG. 2 and described above. FIG. 13 depicts a screen 1300 that shows an exemplary list of pattern options 1302 that the software development tool may generate based on a link element type, and the configurable properties 1311 and 1312 that the software development tool may use to generate the selected "Association as Vector" link pattern 1304. Screen 1400 in FIG. 14 depicts an exemplary screen showing the source code 1402 generated by the software development tool in response to the selected "Association as Vector" pattern of FIG. 13. As illustrated in FIG. 14, the software development tool embeds pattern information 1404 in a comment associated with the source code 1402, which as mentioned advantageously supports documentation of the project and later detection of the pattern in the code.

Applying a Pattern To Existing Code

Applying a pattern to existing code involves generating a pattern instance that replaces in whole or in part a portion of software code for a project, while not altering the external behavior of the remaining software code. Thus, applying a pattern extends the concept of refactoring to improve the design of software after the design has already been coded or written. By utilizing the software development tool to apply a pattern to existing software as described below, a problem in existing software code can be reworked to conform to a solution described with respect to the pattern definition.

Figure 15A:
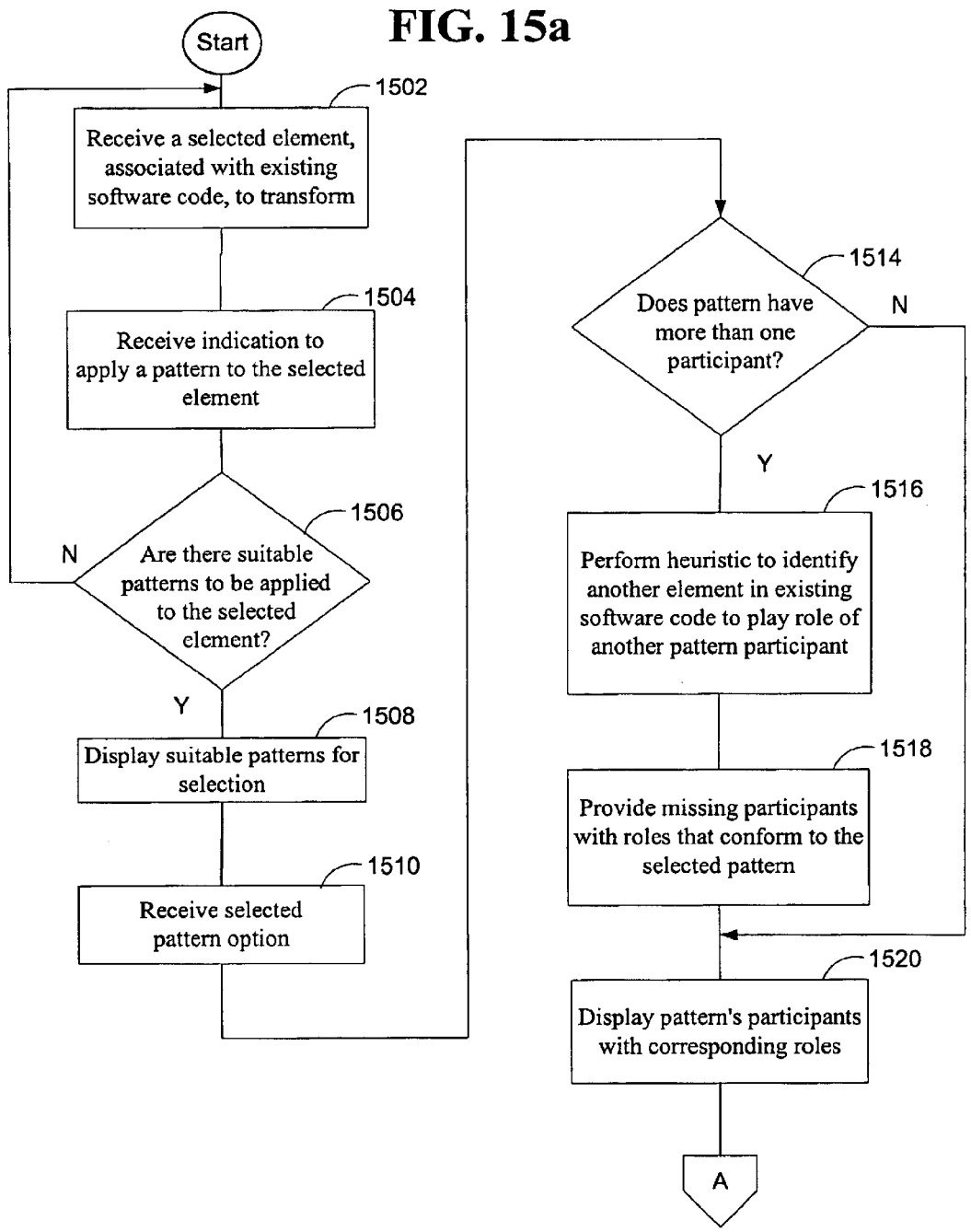
FIG. 15a depicts a flow chart illustrating an exemplary process performed by the software development tool in FIG. 1 for applying a pattern to a portion of existing code.
Figure 15B:
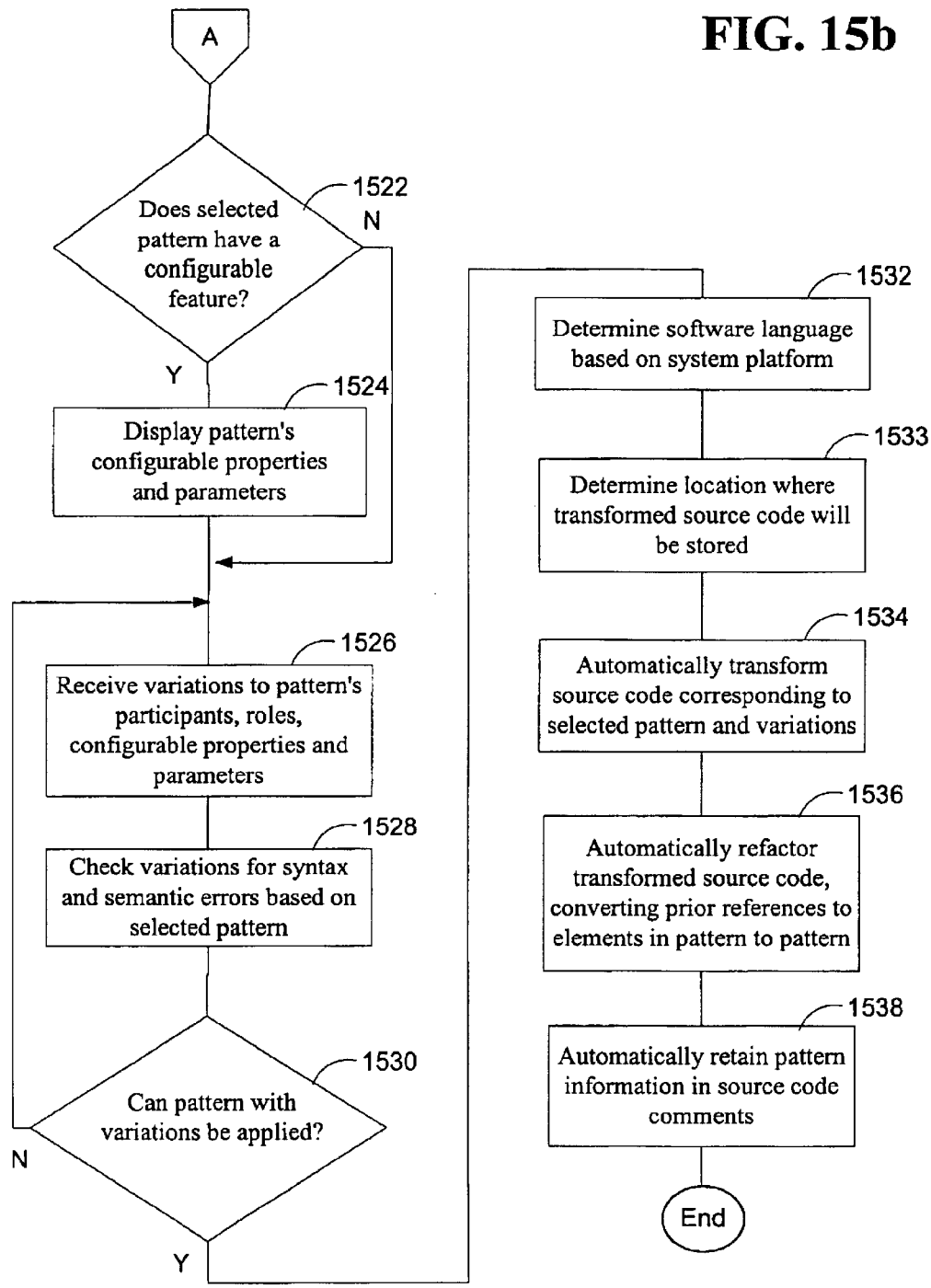
FIG. 15b depicts a flow chart illustrating an exemplary process performed by the software development tool in FIG. 1 for applying a pattern to a portion of existing code.

FIGS. 15a and 15b depict a flow diagram of an exemplary process that the software development tool performs to apply a pattern to existing code. Initially, the software development tool receives an indication of a selected element within the existing code that is to be transformed as a result of applying the pattern (step 1502). The selected element can be a class, a link, or any known object-oriented component (e.g., method or attribute) that may be a participant or identify a relationship in a pattern to be applied.

Figure 16:
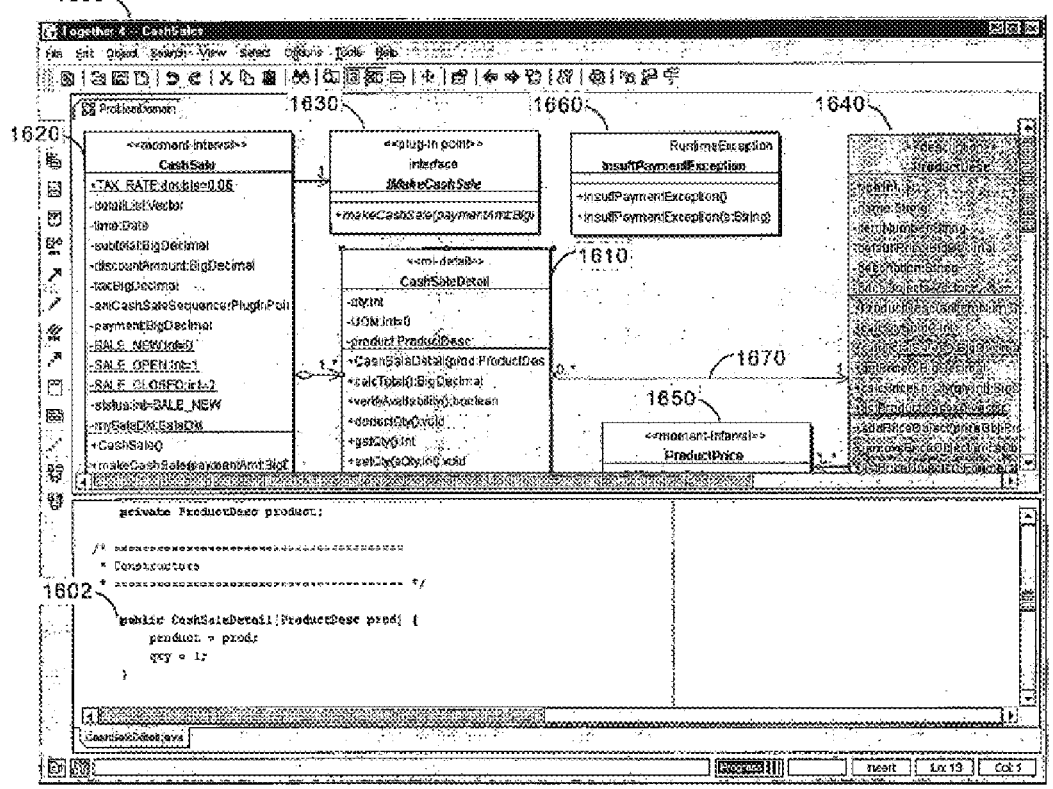
FIG. 16 depicts an exemplary screen showing a selected class element within a portion of existing code prior to the software development tool in FIG. 1 applying a selected pattern to transform the portion.

In one implementation, the software development tool receives the indication of the selected element in response to a developer selecting the graphical notation of the selected element in the graphical editor pane 304. In the example depicted in FIG. 16, screen 1600 shows that the diagram 1602 corresponding to the "CashSaleDetail" class element has been selected. The "CashSaleDetail" class element is a portion of the existing code for a CashSales project 112 that has been read into the TMM 114 data structure 2800 and that is represented graphically by "CashSale" class symbol 1620, "IMakeCashSale" interface symbol 1630, "ProductDesc" class symbol 1640, "ProductPrice" class symbol 1650, and "InsuffPaymentException" class symbol 1660. While the "CashSaleDetail" class element is not in view on source code editor pane 306, the constructor method element "CashSaleDetail (ProductDesc prod)" 1602 which is a defined operation within the "CashSaleDetail" class is in view on the source code editor pane 306, indicating that "CashSaleDetail" class element has been selected. The software development tool may also receive the indication of the selected element to apply a pattern in response to the developer identifying the selected element in the source code editor pane 306.

As shown in FIG. 15a, the software development tool also receives from the developer an indication that a pattern is to be applied to the selected element (step 1504). The indication to apply a pattern to the selected element may be conveyed in response to the developer choosing a respective option from a pull-down menu or from a speed menu that appears when a button on a mouse is actuated while an associated cursor is over the selected element. One skilled in the art will appreciate that any known programming technique for inputting data could be used to convey the same information (i.e., the selected element and the indication to apply a pattern) to the software development tool.

In response to receiving the indication of the selected element and the indication to apply a pattern, the software development tool determines the suitable patterns that may be applied to the selected element (step 1506). The software development tool determines which patterns are suitable based on the type of selected element, such as a class as opposed to a link or a member. To determine suitability, the software development tool checks if a participant in a respective pattern uses the type of selected element. The example shown in FIG. 17 indicates that the Singleton option 1702 has been selected. This corresponds to the software development tool identifying that a Singleton pattern uses an element of type "class." To further illustrate the software development tool analysis of whether a pattern is suitable for applying to a selected element assume that the developer had actually chosen the "IMakeCashSale" interface symbol 1630 as the selected element to apply a pattern. In this example, the software development tool determines that the Singleton pattern uses a class participant that has a static variable that refers to the one instance that is created for the class. The method for creating the one instance of a Singleton and the variable that then refers to the one instance of the class may be delegated to a SingletonFactory class but not an interface. Therefore, the software development tool determines that a Singleton pattern cannot be applied to the selected interface element and the Singleton pattern would not be listed as an option in this example. One skilled in the art will appreciate that a similar analysis could be performed for any pre-defined pattern that has known participants with known roles as previously described.

Figure 17:
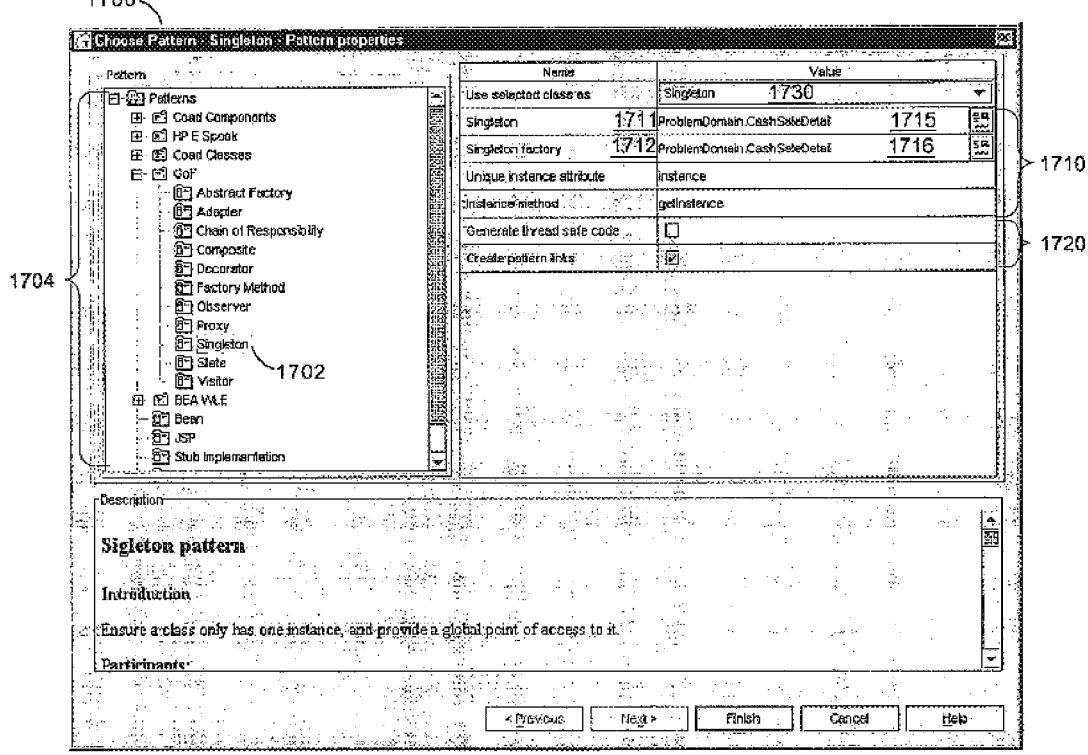
FIG. 17 depicts an exemplary screen showing a list of pattern options that the software development tool in FIG. 1 may, apply to the selected class element in FIG. 16, showing configurable properties and parameters that the software development tool in FIG. 1 may use to apply the selected pattern, and showing a suggested pattern role for the selected class element.
Figure 24:
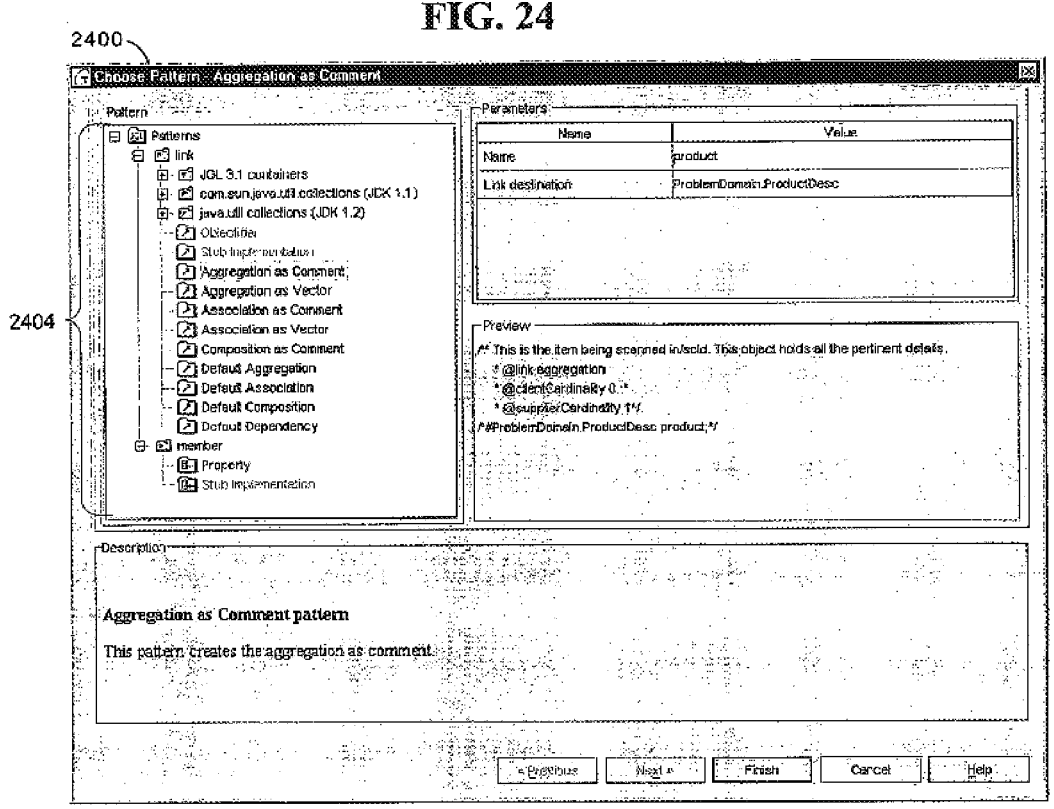
FIG. 24 depicts an exemplary screen showing a list of pattern options that the software development tool in FIG. 1 may apply to a selected link element in FIG. 16 and showing configurable properties and parameters that the software development tool in FIG. 1 may use to apply the selected pattern.

The software development tool then displays the suitable patterns from which the developer can choose (step 1508). FIG. 17 depicts an exemplary screen 1700 that shows a list of pattern options 1704 that the software development tool may apply based on the selected element CashSaleDetail being a class element type. Example pattern options that may be applied to a class are reflected in the list 1704 with their respective descriptions, and are presented in Table 1 herein. Similarly, FIG. 24 depicts an exemplary screen 2400 that shows a list of pattern options 2404 that the software development tool may apply to the selected element 1670 between CashSaleDetail 1610 and ProductDesc 1640, which are of the link element type.

Figure 21:
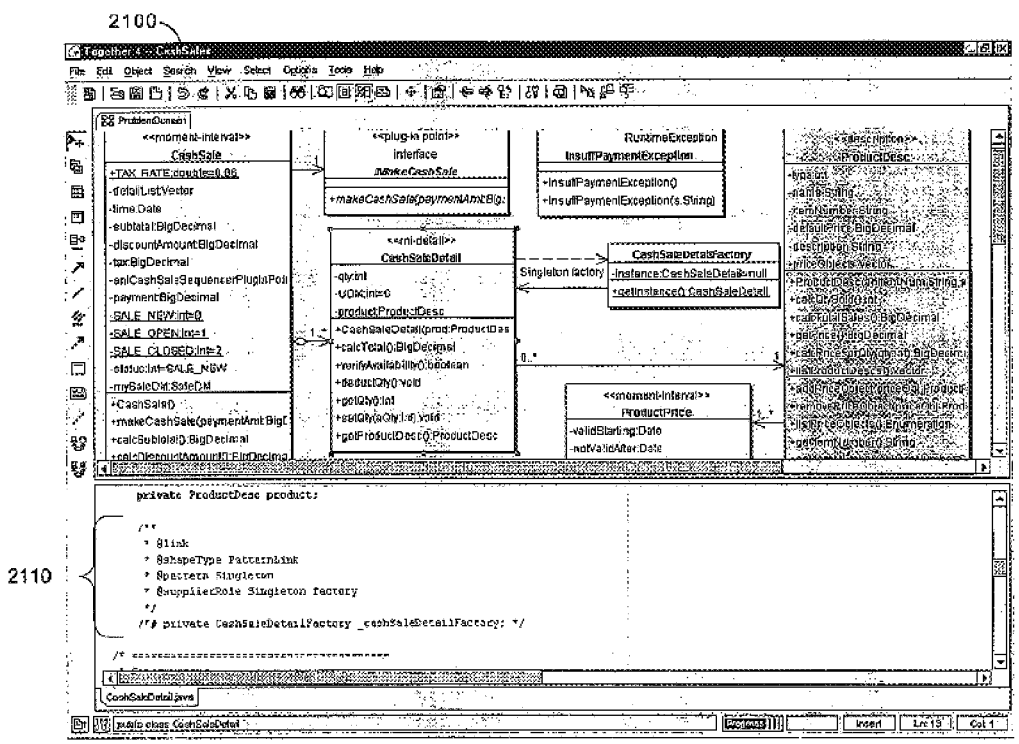
FIG. 21 depicts an exemplary screen showing the transformed source code for one Singleton pattern participant generated by the software development tool in FIG. 1 in response to applying another variation of the selected Singleton pattern shown on screen 1900 in FIG. 19 to the selected class element in FIG. 16.

The software development tool next receives an indication of a selected pattern option (step 1510) from among the pattern options displayed, and determines whether the associated selected pattern has more than one participant (step 1514). In the event that the selected pattern has more than one participant related to an additional element, the software development tool performs a heuristic to determine whether there is another related element in the existing code that is suited to be the additional element, i.e., that is suited to play the role associated with the different pattern participant (step 1516). To determine whether another related element is suited to play the different role in the selected pattern, the software development tool performs the heuristic of locating pattern identification information in a comment associated with the selected element 1610 or associated with other related elements 1620, 1630, 1640, 1650, or 1660. As shown in FIG. 21, identification information 2110 identifies the construct for the related class element "CashSaleDetailFactory" in the comment associated with a Singleton pattern. In this example, the software development tool then knows to search within the existing code for a class element with the name "CashSaleDetailFactory" that may already be suited for playing the role of Singleton Factory.

The software development tool may also utilize a heuristic that combines checking the existing code for common pattern naming conventions of pattern participants (e.g., a class having a name which is or includes "Singleton Factory") with searching the existing code for constructs in other related elements that show the implementation of pattern properties and pattern functions that reflect the role of the different pattern participant. For example, when applying the Singleton pattern, the software development tool will look in the existing code for a class element that has the Singleton pattern attribute of "instance" matched with a "get" function having the same return type of instance. Both are found in the CashSalesDetailFactory class element 2202. Thus, the software development tool would have identified this class to fulfill the different role for the Singleton pattern.

In the event the software development tool does not identify another element that is suitable to play a role of the different pattern participant, the software development tool provides a missing participant needed to complete the selected pattern option (step 1518). After providing the missing participants, or if the pattern does not have more than one participant, the software development tool 110 displays the pattern participants (e.g., 1715 and 1716) and their roles (e.g., 1711 and 1712, respectively) (step 1520). Providing a missing participant includes adding a new software element to the existing code, as explained below in relation to FIGS. 21 and 22.

In addition to displaying the pattern participants and their roles in step 1520, the software development tool also displays a recommended role 1730 for the selected element based on the pattern and the other related elements that were found to be suitable to play a role in the pattern as described above. Because the Singleton pattern can be implemented with only one class, the example depicted in FIG. 17 shows that the selected element (CashSaleDetail class) is assigned the roles of both Singleton 1711 and Singleton Factory 1712.

Figure 23:
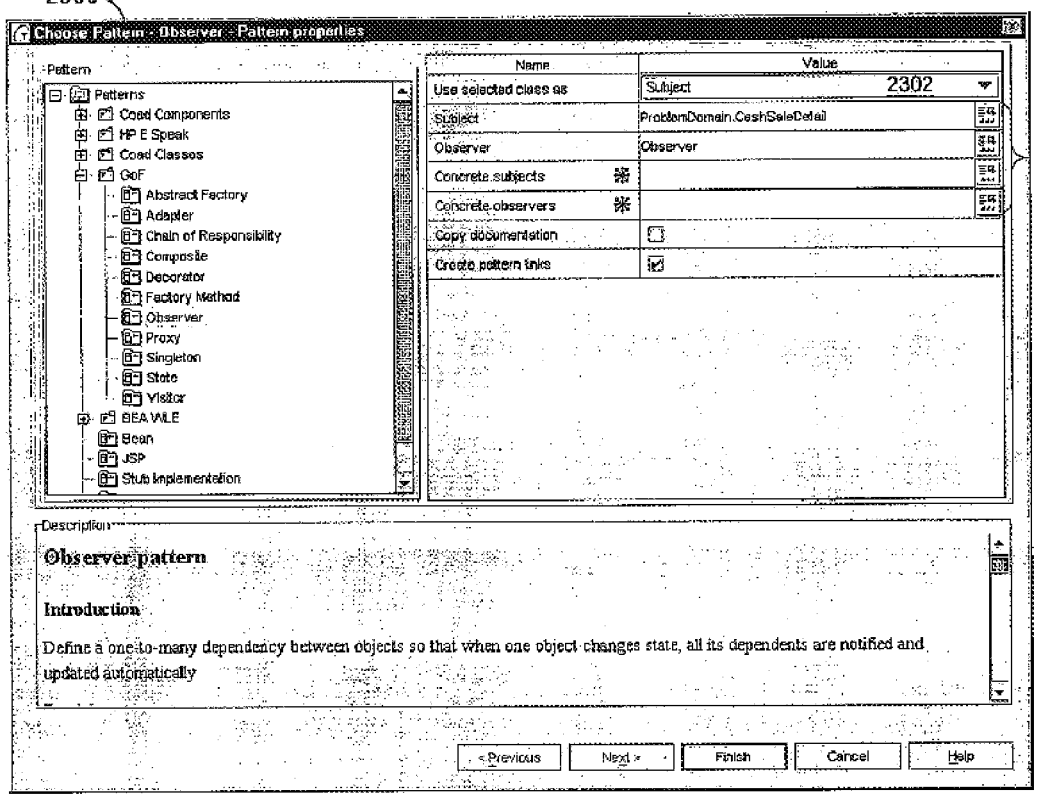
FIG. 23 depicts an exemplary screen showing configurable properties and parameters that the software development tool in FIG. 1 may use to apply an Observer pattern to the selected class element in FIG. 16, and showing a suggested pattern role for the selected class element.

The example depicted on screen 2300 in FIG. 23 shows that the software development tool will provide a recommendation (e.g., subject 2302) for the role of the selected element in a pattern that necessarily has multiple participants (e.g., observer participants 2310) as well, such as for the Observer pattern (a pattern that specifies that an Observer object be notified of a state change of a Subject object).

The software development tool also determines whether the selected pattern has configurable features (step 1522) and displays them (step 1524) for a developer to change in order to vary the application of the pattern as described previously for generating a pattern instance. Configurable features for a pattern include configurable properties 1710 and parameters 1720. As shown in FIG. 17, a role for a pattern participant is a property of the pattern so the software development tool allows roles (e.g., Singleton 1711 and Singleton factory 1712) to be reassigned by the developer to related elements in the existing code. Upon receiving a variation to configurable properties 1710 (including participants and roles) and parameters 1720 (step 1526), the software development tool checks the variation for syntax and semantic errors based on the selected pattern (step 1528), and determines whether the selected pattern with the variation can be applied (e.g., can't enter the name of an interface to be assigned the role of Singleton 1711 or Singleton factory 1712 as previously discussed) (step 1530).

If the selected pattern can be applied, the software development tool determines the software language in which the pattern is to be generated (step 1532) and the location where the transformed source code is to be stored (step 1533). Because the software development tool is applying a pattern to existing software code, the software development tool references the extension of the filename associated with the existing software code to be modified to ascertain the language for applying the selected pattern. For example, Java™ code will have a ".java" extension and C++ code will have a ".cpp" extension. The software development tool may also perform these steps in the same manner as previously described for generating a pattern instance by referencing project variables for language in use and for path to store a software code file.

Once the software language is determined, the software development tool transforms the portion of existing software code corresponding to the selected pattern with any received variation (step 1534) and refactors the transformed source code (step 1536). To transform the portion of the existing software code, the software development tool performs the process steps depicted in FIG. 31 as previously described to invoke the TMM 114 to produce the pattern code in the project 112. Transforming the portion of existing software code generally means adding, modifying, or replacing the code in the selected element or in the other related elements that were designated as pattern participants to reflect a role played by a respective pattern participant. Code elements that are added to a participant in the pattern correspond to attributes, methods, or constructs needed to define and implement a role for the participant. Refactoring may comprise changing a reference to the selected element or related element that have become a participant in the applied pattern to an appropriate reference within the pattern.

Figure 18:
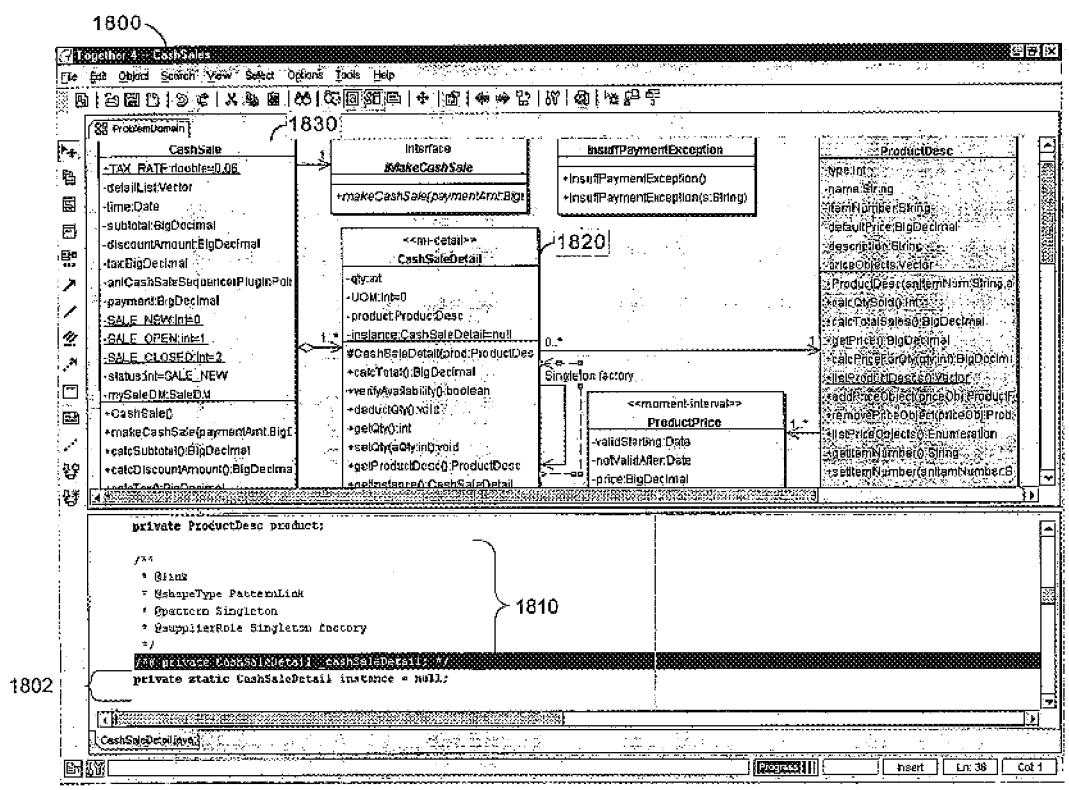
FIG. 18 depicts an exemplary screen showing a first portion of the transformed source code and its corresponding graphical representation generated by the software development tool in FIG. 1 in response to applying a variation of the selected Singleton pattern to the selected class element in FIG. 16.
Figure 19:
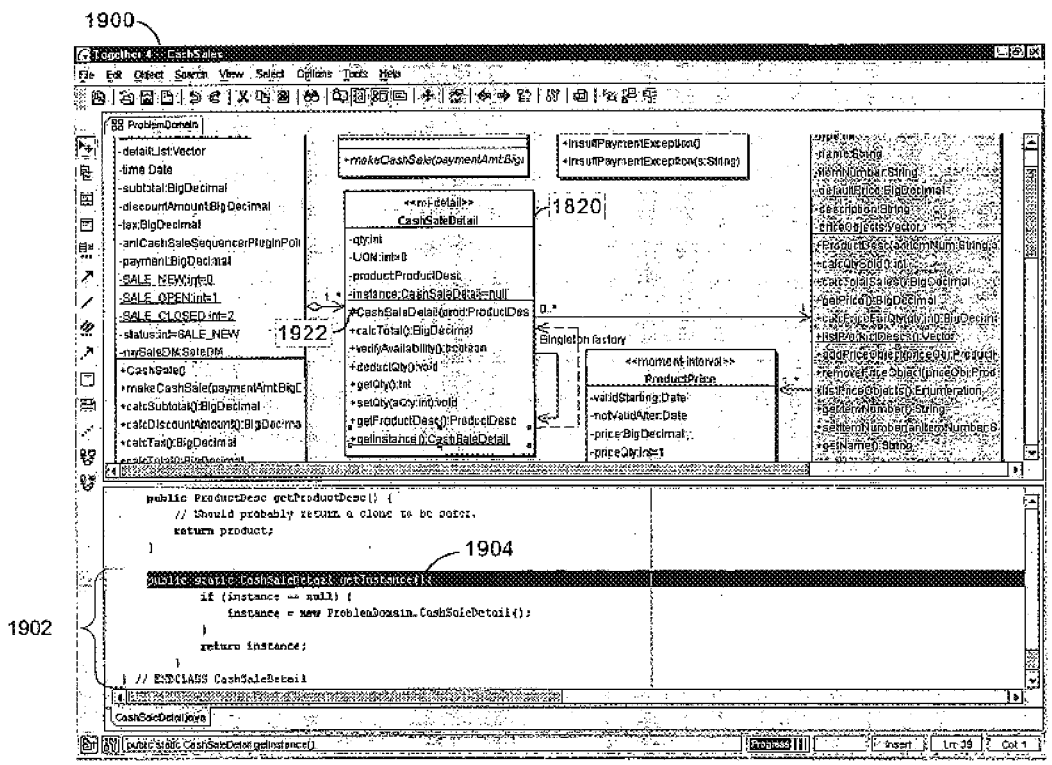
FIG. 19 depicts an exemplary screen showing a second portion of the transformed source code and its corresponding graphical representation generated by the software development tool in FIG. 1 in response to applying a variation of the selected Singleton pattern to the selected class element in FIG. 16.

For example, applying the Singleton pattern variation shown in FIG. 17, the software development tool transforms the selected CashSaleDetail class by adding the attribute "instance" 1802, the method "getInstance" 1902, and the construct "protected" (not shown in source code editor) that is graphically depicted as a "#" addition to the constructor for CashSaleDetail 1922. These elements are added to CashSaleDetail to prevent other objects from creating separate instances of this class. Any other class (e.g., CashSale class graphically depicted as diagram 1830) referencing the CashSaleDetail class (graphically depicted as diagram 1820 on screen 1800 in FIG. 18) calls getInstance 1904 rather than construct an instance of the Singleton, CashSaleDetail, themselves. Hence, as part of applying the Singleton pattern, the software development tool searches the existing code for prior references to the CashSaleDetail class and refactors the prior reference to include a call to the getInstance 1904 method to preserve the one instance of CashSaleDetail class. The pattern identification information is retained by storing the identification information for the selected pattern in a comment associated with the generated software code based on the selected pattern (step 1538).

Figure 20:
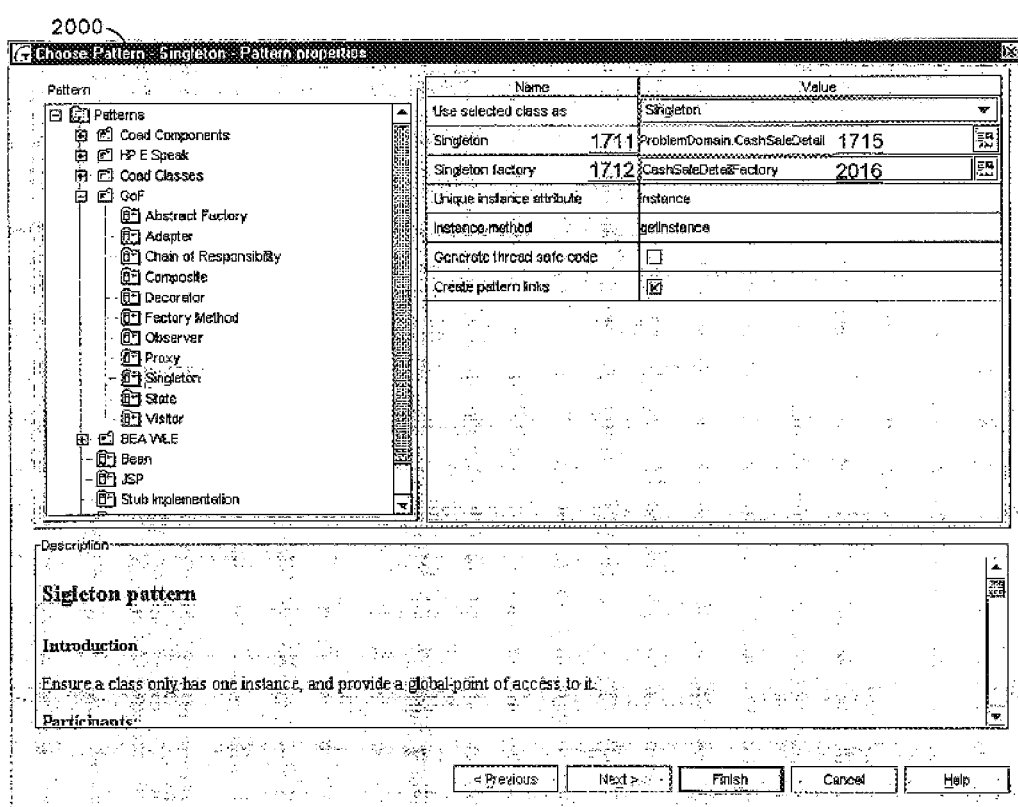
FIG. 20 depicts an exemplary screen showing another variation in the configurable properties and parameters that the software development tool in FIG. 1 may use to apply the selected Singleton pattern.
Figure 22:
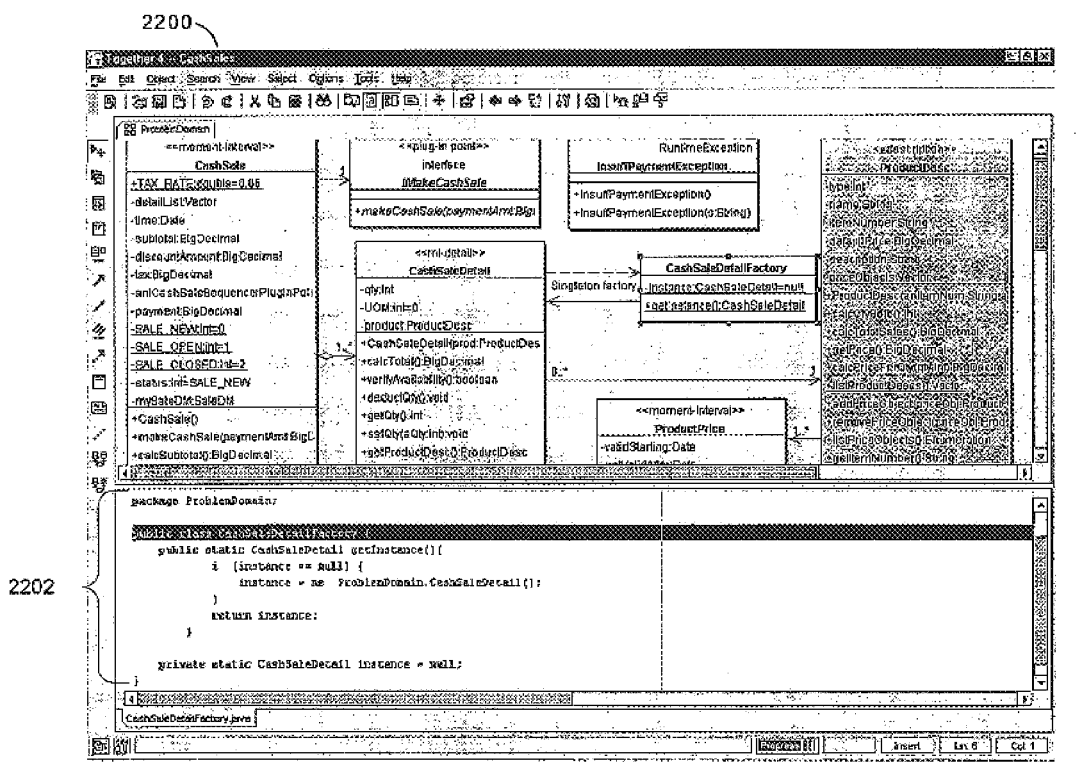
FIG. 22 depicts an exemplary screen showing the transformed source code for a second Singleton pattern participant generated by the software development tool in FIG. 1 in response to applying another variation of the selected Singleton pattern to the selected class element in FIG. 16.

In another example shown on screens 2000, 2100 and 2200 in FIGS. 20–22, respectively, the software development tool receives a variation in the selected Singleton pattern that calls for the roles of Singleton 1711 and Singleton factory 1712 to be associated with two different participants (i.e., 1715 and 2016). Based on the variation, the software development tool searches the existing code for the participant "CashSaleDetailFactory" 2016, determines that this participant is missing, and generates the source code 2202 for the missing participant 2016.

To complete the application of a pattern to a portion of existing code that includes the selected element, the software development tool generates identification information 1810 and 2110 for the selected pattern 302 in a comment field associated with the existing code such that the pattern can be detected in the existing code. This facilitates the automatic detection of a bad or anti-pattern in order to apply a new pattern as the software development tool can find bad pattern participants by searching the comment fields in the existing code as opposed to searching elements in the existing code for naming conventions or constructs associated with the bad pattern participants. Thus, it is contemplated that in lieu of receiving a selected element to apply a pattern, the software development tool may receive a selected anti-pattern to automatically detect. To detect the anti-pattern, the software development tool may follow one or more detection rules or heuristics as described herein for applying a pattern to a selected element. Thus, the software development tool advantageously will support updating existing code associated with new versions of known patterns (e.g., a new implementation of the Singleton pattern), and deem the older, previously applied pattern as being "bad" and in need of replacement.

Defining A New Pattern From Existing Code

Figure 25:
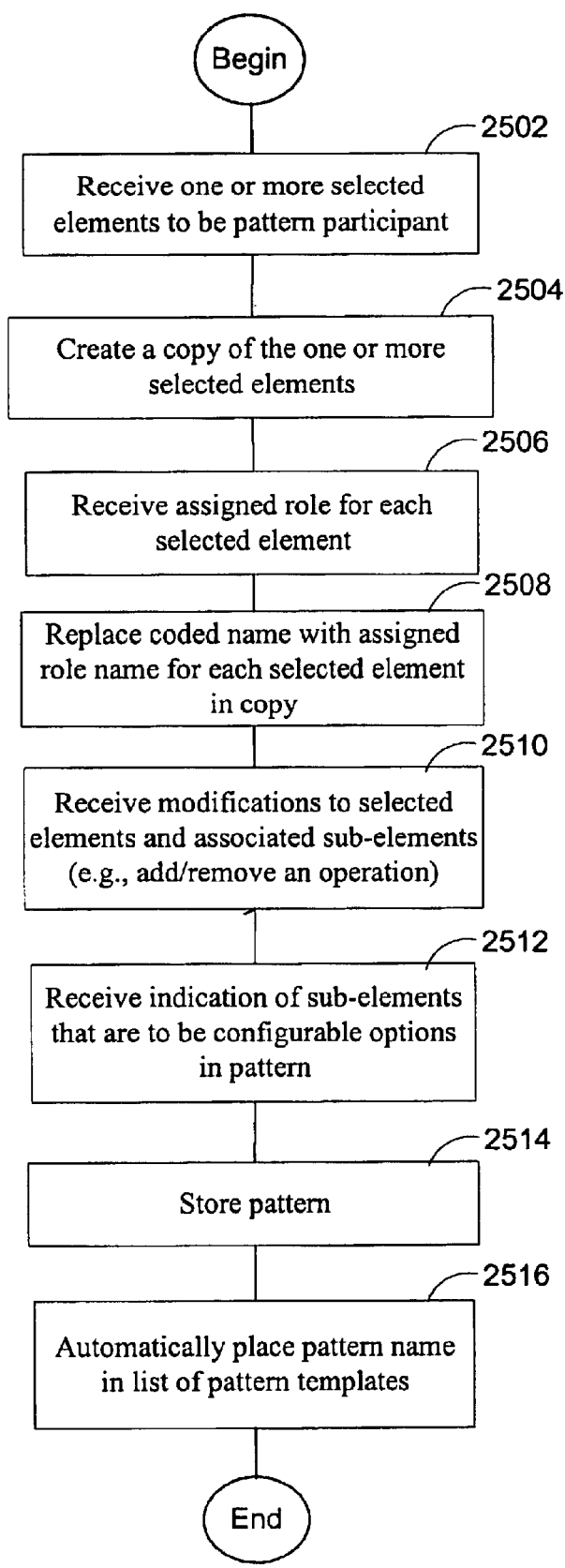
FIG. 25 depicts a flow chart illustrating an exemplary process performed by the software development tool in FIG. 1 for capturing a user-defined pattern from existing code.

The software development tool may also be used to define and store a new pattern based on a developer's identification of related elements within existing code. FIG. 25 depicts a flow diagram illustrating an exemplary process performed by the software development tool for capturing a user-defined pattern. As one skilled in the art will appreciate, any known programming input mechanism may be used to signal the software development tool that a developer wishes to define a pattern. As shown in FIG. 25, the software development tool receives an identification of one or more selected elements to be pattern participants in the user-defined pattern (step 2502). The developer conveys which elements in the existing code are to be included in the pattern by clicking a mouse button when an associated cursor is over one of the selected elements in the source code pane 306 or when the associated cursor is over the respective graphical notation in the graphical code pane 304. Alternatively, the developer may convey the group of elements to be included in the user-defined pattern by utilizing a known drag and drop feature of a mouse to corral the group of elements textually or graphically.

Figure 26:
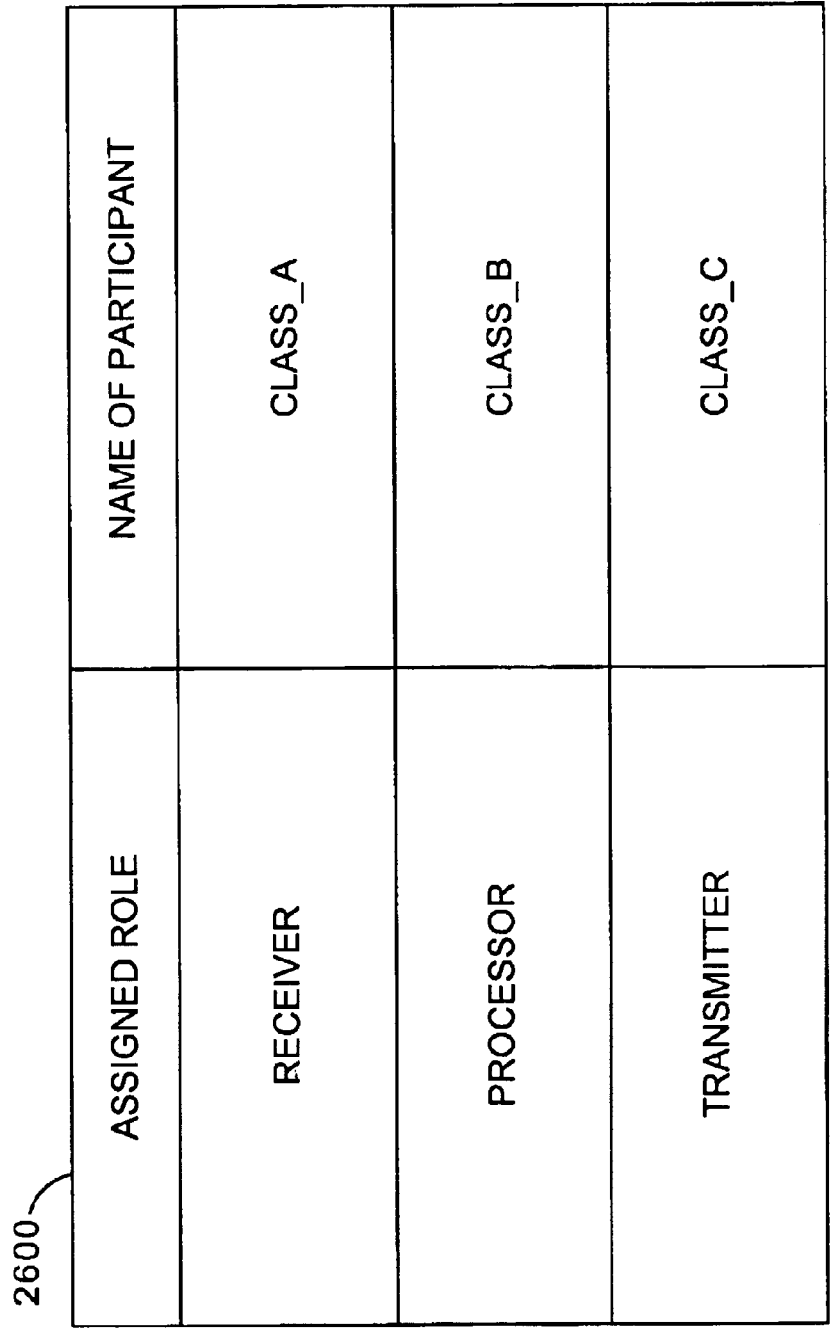
FIG. 26 depicts an exemplary dialog box that the software development tool in FIG. 1 may use to display a user identified pattern participant and to receive a role to be assigned to the identified pattern participant.

After an identification of the one or more selected elements to be pattern participants is received, the software development tool creates a copy of the one or more selected elements (step 2504). Each of the one or more selected elements has a coded name and has an associated sub-element, such as an attribute or method. The software development tool next receives an assigned role name for each selected element identified by the developer as a participant in the pattern (step 2506). FIG. 26 depicts an exemplary dialog box 2600 that the software development tool may use to display the user-identified one or more pattern participants and to receive a role name to be assigned to the identified one or more pattern participants. The role name is indicative of the operation that the participant handles within the existing code in relation to the related elements that have been identified as participants in the pattern. The software development tool then locates within the copied portion of the existing code the coded name of each identified one or more pattern participants and replaces the coded name with the respective assigned role name (step 2508). This advantageously allows any subsequent developer to easily utilize this defined pattern where appropriate based on the roles assigned to participants in the pattern.

The software development tool also receives modifications to the one or more selected elements in the copied portion of the existing code (step 2510). In this step the developer may be allowed to modify or remove an operation from the one or more selected elements or identified pattern participants. Thus, sections of the copied portion of the existing code that are not essential to be preserved as part of the pattern can be removed. In addition, the software development tool may receive an indication from the developer identifying sub-elements (e.g., attributes or methods) of the one or more elements that are to be configurable options in the pattern (step 2512). The software development tool may mark or enclose each configurable sub-element with a known identifier (e.g., "^subelement^") that is not part of a construct or operator for the software language associated with the existing code. When the pattern is utilized in future software projects, the software development tool when prompted to apply the defined pattern can easily identify, display, and then receive a variation to the sub-element that the developer indicated would be configurable.

The software development tool then stores the pattern (step 2514) and places the pattern name in the list of other pattern templates (step 2516). The pattern name may be one of the role names assigned by the developer or a name provided by the developer to capture the purpose served by the pattern or the solution that the pattern solves.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method in a data processing system having a plurality of patterns, wherein each of the plurality of patterns has an associated element type, the method comprising the steps of:

receiving an indication of an element type, wherein the element type is a class, link, or any known object-oriented component of a software program;

displaying a matching one of the plurality of patterns, the matching pattern having an associated element type that matches the received element type;

receiving from a user an indication of a selection of the matching pattern;

receiving an indication of a variation;

modifying the matching pattern based on the variation;

receiving an identification of a language; and generating software code reflecting the modified matching pattern, wherein the software code is generated in the language.

2. The method of claim 1 further comprising the step of determining whether the variation is suitable for the matching pattern before modifying the matching pattern.

3. The method of claim 1, further comprising the step of storing identification information for the matching pattern in a comment associated with the generated software code.

4. The method of claim 1, wherein the step of generating includes the steps of determining a location for storing the generated software code and storing the generated software code at the location.

5. A method in a data processing system having a pattern, wherein the pattern has a first participant playing a first role in the pattern and a second participant playing a second role in the pattern, the method comprising the steps of:

receiving an indication of a first of a plurality of software elements, wherein the first of the plurality of software elements is a substantiation of an element type; wherein the element type is a class, link, or any known object-oriented component of a software program;

determining whether the first software element is capable of playing the first role;

when it is determined that the first software element is capable of playing the first role;

determining whether a second of the plurality of software elements is capable of playing the second role, wherein the second of the plurality of software elements is a substantiation of an element type;

when it is determined that the second software element is capable of playing the second role;

designating that the first software element plays the first role in the pattern; and designating that the second software element plays the second role in the pattern.

6. The method of claim 5, further including the step of, when it is determined that the second software element is not capable of playing the second role, designating that a missing participant plays the second role in the pattern.

7. The method of claim 5, wherein the step of designating the first software element includes the steps of:

detecting a portion of the first software element; and replacing the portion of the first software element with at least a portion of the first participant.

8. The method of claim 5, further comprising the steps of:

receiving an indication of a variation for the first participant; and modifying the first participant with the variation before the first software element is designated to play the first role in the pattern.

9. The method of claim 8, further comprising the steps of:

receiving an indication of a second variation for the second participant; and modifying the second participant with the second variation before the second software element is designated to play the second role of the pattern.

10. The method of claim 5, further comprising the step of storing identification information for the pattern in a comment associated with the software code.

11. A method in a data processing system for creating a pattern having a first particular with a first role name, and a second particular with a second role name, wherein the pattern is based on code having a first software element with a first coded name and a second software element with a second coded name, the method comprising the steps of:

receiving an indication of the first software element, wherein the first software element is a substantiation of an element type; wherein the element type is a class, link, or any known object-oriented component of a software program;

receiving an indication that the first software element corresponds to the first participant;

replacing the first coded name of the first software element with the first role name of the first participant;

receiving an indication of the second software element, wherein the second software element is a substantiation of an element type;

receiving an indication that the second software element corresponds to the second participant;

replacing the second coded name of the second software element with the second role name of the second participant; and storing the code with the first coded name and the second coded name as the pattern.

12. A computer-readable medium containing instructions for controlling a data processing system to perform a method, the data processing system having a plurality of patterns, wherein each of the plurality of patterns has an associated element type, the method comprising the steps of:

receiving an indication of an element type, wherein the element type is a class, link, or any known object oriented component of a software program;

displaying a matching one of the plurality of patterns, the matching pattern having an associated element type that matches the received element type;

receiving from a user an indication of a selection of the matching pattern;

receiving an indication of a variation;

modifying the matching pattern based on the variation;

receiving an identification of a language; and generating software code reflecting the modified matching pattern, wherein the software code is generated in the language.

13. The computer-readable medium of claim 12, wherein the method further comprises the step of determining whether the variation is suitable for the matching pattern before modifying the matching pattern.

14. The computer-readable medium of claim 12, wherein the method further comprises the step of storing identification information for the matching pattern in a comment associated with the generated software code.

15. The computer-readable medium of claim 12, wherein the step of generating includes the steps of determining a location for storing the generated software code and storing the generated software code at the location.

16. A computer-readable medium containing instructions for controlling a data processing system to perform a method, the data processing system having a pattern, wherein the pattern has a first participant playing a first role in the pattern and a second participant playing a second role in the pattern, the method comprising the steps of:

receiving an indication of a first of a plurality of software elements, wherein the first of the plurality of software elements is a substantiation of an element type; wherein the element type is a class, link, or any known object-oriented component of a software program;

determining whether the first software element is capable of playing the first role;

when it is determined that the first software element is capable of playing the first role;

determining whether a second of the plurality of software elements is capable of playing the second role, wherein the second of the plurality of software elements is a substantiation of an element type;

when it is determined that the second software element is capable of playing the second role;

designating that the first software element plays the first role in the pattern; and designating that the second software element plays the second role in the pattern.

17. The computer-readable medium of claim 16, wherein the method further includes the step of, when it is determined that the second software element is not capable of playing the second role, designating that a missing participant plays the second role in the pattern.

18. The computer-readable medium of claim 16, wherein the step of designating the first software element includes the steps of:

detecting a portion of the first software element; and replacing the portion of the first software element with at least a portion of the first participant.

19. The computer-readable medium of claim 16, wherein the method further comprises the steps of:

receiving an indication of a variation for the first participant; and modifying the first participant with the variation before the first software element is designated to play the first role in the pattern.

20. The computer-readable medium of claim 19, wherein the method further comprises the steps of:

receiving an indication of a second variation for the second participant; and modifying the second participant with the second variation before the second software element is designated to play the second role of the pattern.

21. The computer-readable medium of claim 16, wherein the method further comprises the step of storing identification information for the pattern in a comment associated with the software code.

22. A computer-readable medium containing instructions for controlling a data processing system to perform a method, the data processing system having a pattern having a first participant with a first role name, and a second participant with a second role name, wherein the pattern is based on code having a first software element with a first coded name and a second software element with a second coded name, the method comprising the steps of:

receiving an indication of the first software element, wherein the first software element is a substantiation of an element type; wherein the element type is a class, link, or any known object-oriented component of a software program;

receiving an indication that the first software element corresponds to the first participant;

replacing the first coded name of the first software element with the first role name of the first participant;

receiving an indication of the second software element, wherein the second software element is a substantiation of an element type;

receiving an indication that the second software element corresponds to the second participant;

replacing the second coded name of the second software element with the second role name of the second participant; and storing the code with the first coded name and the second coded name as the pattern.

* * * * *

UNITED STATES PATENT AND TRADEMARK OFFICE
CERTIFICATE OF CORRECTION

PATENT NO. : 6,851,105 B1  
DATED : February 1, 2005  
INVENTOR(S) : Peter Coad et al.

It is certified that error appears in the above-identified patent and that said Letters Patent is hereby corrected as shown below:

Column 7,
Line 31, the word "fir" should be deleted.

Column 33,
Lines 2-3, the word "particular" should be -- participant --.

Signed and Sealed this

Seventeenth Day of May, 2005

JON W. DUDAS
*Director of the United States Patent and Trademark Office*